US012671637B2

(12) United States Patent
Kim et al.

(10) Patent No.: US 12,671,637 B2
(45) Date of Patent: Jun. 30, 2026

(54) METHOD AND APPARATUS FOR PROCESSING TRAFFIC BY USING ARTIFICIAL INTELLIGENCE MODEL IN WIRELESS COMMUNICATION SYSTEM

(71) Applicant: Samsung Electronics Co., Ltd., Gyeonggi-do (KR)

(72) Inventors: Sunhyun Kim, Gyeonggi-do (KR); Jiyoung Cha, Gyeonggi-do (KR); Sangho Lee, Gyeonggi-do (KR); Dongmyung Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 295 days.

(21) Appl. No.: 18/523,006

(22) Filed: Nov. 29, 2023

(65) Prior Publication Data

US 2024/0205116 A1      Jun. 20, 2024

(30) Foreign Application Priority Data

Dec. 19, 2022      (KR) ........................ 10-2022-0178624

(51) Int. Cl.
| | |
|---|---|
| *H04W 16/18* | (2009.01) |
| *H04L 43/026* | (2022.01) |
| *H04W 24/02* | (2009.01) |
| *H04W 24/08* | (2009.01) |

(52) U.S. Cl.
CPC ........... *H04L 43/026* (2013.01); *H04W 16/18* (2013.01); *H04W 24/02* (2013.01); *H04W 24/08* (2013.01)

(58) Field of Classification Search
CPC ... H04L 43/026; H04L 41/16; H04L 41/5003; H04L 41/082; H04L 63/0428; H04W 16/18; H04W 24/02; H04W 24/08; H04W 28/24; H04W 88/14
See application file for complete search history.

(56) References Cited

U.S. PATENT DOCUMENTS

| | | |
|---|---|---|
| 2014/0219088 A1 | 8/2014 | Oyman et al. |
| 2016/0219088 A1 | 7/2016 | Ma et al. |
| 2022/0014475 A1 | 1/2022 | Sun et al. |
| 2022/0272043 A1* | 8/2022 | Mishra ................... G06N 20/00 |

(Continued)

FOREIGN PATENT DOCUMENTS

| | | |
|---|---|---|
| CN | 106911699 | 6/2017 |
| CN | 114979086 | 8/2022 |

(Continued)

*Primary Examiner* — Schquita D Goodwin
(74) *Attorney, Agent, or Firm* — The Farrell Law Firm, P.C.

(57) ABSTRACT

The present disclosure relates to a 5G communication system or a 6G communication system for supporting higher data rates beyond a 4G communication system such as long term evolution (LTE). A method performed by a user plane function (UPF) node in a wireless communication system includes receiving multiple traffic packets; identifying at least one encrypted traffic packet among the multiple traffic packets; identifying frame type information of the at least one traffic packet, based on an artificial intelligence (AI) model embedded in the UPF; identifying a quality of service (QoS) flow corresponding to at least one traffic packet, based on the identified frame type information; and transmitting the at least one traffic packet, based on the identified QoS flow.

20 Claims, 15 Drawing Sheets

(56) References Cited

U.S. PATENT DOCUMENTS

| 2023/0074884 A1* | 3/2023 | Alasti | H04W 28/095 |
| 2023/0076014 A1* | 3/2023 | Stephens | H04N 21/2312 |
| 2024/0121163 A1* | 4/2024 | Xu | H04L 41/16 |
| 2024/0406780 A1* | 12/2024 | Cao | H04W 24/08 |
| 2024/0414063 A1* | 12/2024 | Liu | H04L 41/145 |
| 2025/0212050 A1* | 6/2025 | Iwasaki | H04W 72/0457 |
| 2025/0247746 A1* | 7/2025 | Zhang | H04L 41/0894 |
| 2025/0386240 A1* | 12/2025 | Xu | H04W 24/08 |

FOREIGN PATENT DOCUMENTS

| WO | WO 2022/123532 | 1/2022 |
| WO | WO 2022/179085 | 9/2022 |

* cited by examiner

METHOD AND APPARATUS FOR PROCESSING TRAFFIC BY USING ARTIFICIAL INTELLIGENCE MODEL IN WIRELESS COMMUNICATION SYSTEM

CROSS-REFERENCE TO RELATED APPLICATION(S)

This application is based on and claims priority under 35 U.S.C. § 119 to Korean Patent Application No. 10-2022-0178624, filed on Dec. 19, 2022 in the Korean Intellectual Property Office, the disclosure of which is incorporated herein by reference in its entirety.

BACKGROUND

1. Field

The disclosure relates to a method and an apparatus for processing traffic by using an artificial intelligence (AI) model in a wireless communication system, and more particularly, to a method and an apparatus for enabling a user plane function (UPF) having an AI model embedded therein to process traffic, based on online training, in a wireless communication system.

2. Description of Related Art

Considering the development of wireless communication from generation to generation, the technologies have been developed mainly for services targeting humans, such as voice calls, multimedia services, and data services. Following the commercialization of 5G (5th generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G (6th generation) era, there have been ongoing efforts to develop improved 6G communication systems. For these reasons, 6G communication systems are referred to as beyond-5G systems. 6G communication systems, which are expected to be commercialized around 2030, will have a peak data rate of tera (1,000 giga)—level bit per second (bps) and a radio latency less than 100 sec, and thus will be 50 times as fast as 5G communication systems and have the $\frac{1}{10}$ radio latency thereof.

In order to accomplish such a high data rate and an ultra-low latency, it has been considered to implement 6G communication systems in a terahertz (THz) band (for example, 95 gigahertz (GHz) to 3THz bands). It is expected that, due to a more sever path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple-input multiple-output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum, and reconfigurable intelligent surface (RIS).

Moreover, in order to improve spectral efficiency and overall network performances, the following technologies have been developed for 6G communication systems: a full-duplex technology for enabling an uplink transmission and a downlink transmission to simultaneously use the same frequency resource at the same time; a network technology for utilizing satellites, high-altitude platform stations (HAPS), and the like in an integrated manner; an improved network structure for supporting mobile base stations and the like and enabling network operation optimization and automation and the like; a dynamic spectrum sharing technology via collision avoidance based on a prediction of spectrum usage; use of artificial intelligence (AI) in wireless communication for improvement of overall network operation by utilizing AI from a designing phase for developing 6G and internalizing end-to-end AI support functions; and a next-generation distributed computing technology for overcoming the limits of user equipment (UE) computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

As described above, in line with development of wireless communication systems, there is a need for a scheme for providing various services including an XR service to users and, more particularly, a scheme for distinguishing the frame type of traffic and adaptively applying quality of service (QoS) for efficient compression and transmission.

SUMMARY

According to an embodiment, a method performed by a user plane function (UPF) node in a wireless communication system includes receiving multiple traffic packets, identifying at least one encrypted traffic packet among the multiple traffic packets, identifying frame type information of the at least one traffic packet, based on an AI model embedded in the UPF, identifying a QoS flow corresponding to at least one traffic packet, based on the identified frame type information, and transmitting the at least one traffic packet, based on the identified QoS flow.

According to an embodiment, a UPF node in a wireless communication system includes at least one transceiver, and at least one processor functionally coupled to the at least one transceiver. The at least one processor is configured to receive multiple traffic packets, identify at least one encrypted traffic packet among the multiple traffic packets, identify frame type information of the at least one traffic packet, based on an AI model embedded in the UPF, identify a QoS flow corresponding to at least one traffic packet, based on the identified frame type information, and transmitting the at least one traffic packet, based on the identified QoS flow.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
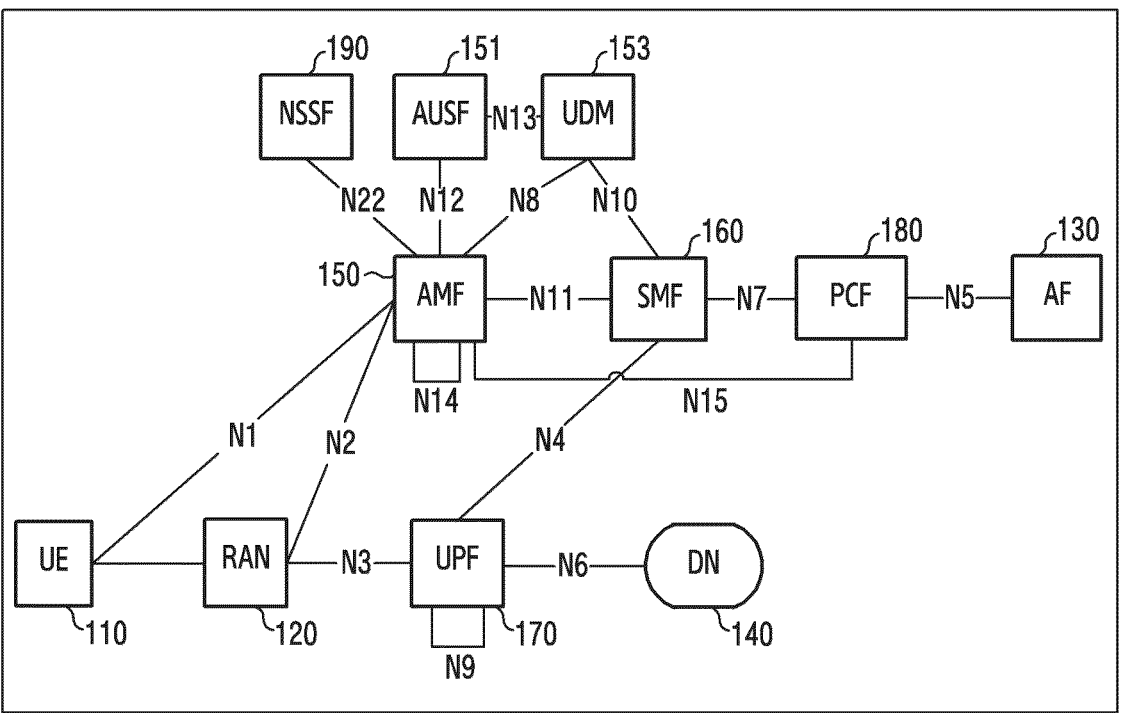
FIG. 1 illustrates a communication network including core network entities in a wireless communication system, according to an embodiment.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the same or similar meanings as the contextual meanings in the relevant field of art, and are not to be interpreted to have ideal or excessively formal meanings unless clearly defined in the disclosure. In some cases, even the terms defined in the disclosure should not be interpreted to exclude embodiments of the disclosure.

Hereinafter, various embodiments of the disclosure will be described based on an approach of hardware. However, various embodiments of the disclosure include a technology that uses both hardware and software, and thus the various embodiments of the disclosure may not exclude the perspective of software.

The present disclosure provides a method and an apparatus capable of providing highly efficient service in a wireless communication system. In addition, the present disclosure provides a method and an apparatus for differentially applying QoS with regard to each frame type of traffic by using an AI model in a wireless communication system.

Various embodiments of the disclosure may advantageously provide an apparatus and a method capable of effectively providing a service in a wireless communication system. Advantageous effects obtainable from the disclosure may not be limited to the effects mentioned in various embodiments, and other effects which are not mentioned may be clearly understood, through the following descriptions, by those skilled in the art to which the disclosure pertains.

Hereinafter, the operation principle of the disclosure will be described in detail with reference to the accompanying drawings. In describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

For the same reason, in the accompanying drawings, some elements may be exaggerated, omitted, or schematically illustrated. Furthermore, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, executed via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used in embodiments of the disclosure, the term "unit" refers to a software element or a hardware element, such as a field programmable gate array (FPGA) or an application specific integrated circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit," or divided into a larger number of elements, or a "unit." Moreover, the elements and "units" may be implemented to reproduce one or more central processing units (CPUs) within a device or a security multimedia card. Furthermore, the "unit" in the embodiments may include one or more processors.

The embodiments described below may also be applied to other communication systems having similar technical backgrounds or channel types to the embodiments of the disclosure. Furthermore, based on determinations by those skilled in the art, the embodiments of the disclosure may also be applied to other communication systems through some modifications without significantly departing from the scope of the disclosure.

In describing embodiments of the disclosure in detail, a communication system may be described using various wired or wireless communication systems, for example, new RAN (NR) as a radio access network (RAN) and packet core as a core network (5G system, 5G core network, or next generation core (NG core)) which are specified in the 5G communication standards defined by the 3rd generation partnership project (3GPP) that is a wireless communication standardization group. Also, based on determinations by those skilled in the art, the disclosure may also be applied to other communication systems having similar technical backgrounds through some modifications without significantly departing from the scope of the disclosure.

In the following description, terms for identifying access nodes, terms referring to network entities (i.e., network functions), terms referring to messages, terms referring to interfaces between network functions (NFs), terms referring to various identification information, and the like, are illustratively used for the sake of descriptive convenience. Therefore, the disclosure is not limited by the terms as used below, and other terms referring to subjects having equivalent technical meanings may be used.

Furthermore, various embodiments of the disclosure will be described using terms defined in some communication standards (e.g., the 3GPP), but they are only for the sake of descriptive illustration. Various embodiments of the disclosure may also be easily applied to systems through modifications.

Services requiring a service characterized by a high transmission and a low latency (high data rate low latency (HDRLL)) may include an extended reality (XR) service, an augmented reality (AR) service, a virtual reality (VR) service, a cloud gaming service, and the like. In the case of the VR service, VR headsets or the like may be used to provide a virtual environment implemented by a computer device. In the case of the AR service, geographic information or the like may be used to combine the actual world with a virtual environment. In the case of the XR service, in addition to combining the actual world with a virtual environment, tactile, auditory, olfactory, and other kinds of information may be provided together to users, thereby improving the degree of immersion of users.

In the case of the XR/AR/VR services, multiple devices may be used to provide services. For example, when a network provides audio, video, and haptic services to users, devices for the audio service, devices for the video service, and devices for the haptic service (implementing the feeling of touches by applying vibration, motions, and the like) may be different. It is only when XR/AR/VR data (for example, traffic or traffic packets) arriving at respective devices through the network are delivered to users within an appropriate time that high immersive XR/AR/VR services are provided to users. According to various embodiments, a traffic compression technology may be used such that, when providing XR/AR/VR services (hereinafter, simply referred to as an XR service as a whole in embodiments of the disclosure), different kinds of XR traffic can be efficiently delivered to users. In the disclosure, the term "traffic" or "packets" is used for convenience of description, and may include all traffic or packets for a service delivered from networks to users, including XR data.

Although compression and transmission of traffic packets according to embodiments will be described based on the XR service for convenience of description, the same is applicable not only to the XR service, but also to various data services in which multiple devices need to provide service to a single user in a harmonized manner. It is thus to be noted that embodiments of the disclosure are not limited to the XR service.

As described above, in order to efficiently deliver traffic (for example, packets) for using the XR service, the frame type of each packet may be distinguished, thereby applying QoS differentially. Various embodiments use an AI model such that the frame type can be distinguished even in the case of an encrypted packet, thereby efficiently providing services.

FIG. 1 illustrates a communication network including core network entities in a wireless communication system, according to an embodiment. A 5G mobile communication network may include 5G user equipment (UE) 110, a 5G radio access network (RAN) 120, and a 5G core network.

The 5G core network may be configured to include an access and mobility management function (AMF) 150 for providing a UE mobility management function, a session management function (SMF) 160 for providing a session management function, a user plane function (UPF) 170 configured to perform a data delivery role, a policy control function (PCF) 180 for providing a policy control function, a unified data management (UDM) 153 for providing subscriber data, policy control data, and other kinds of data management functions, or network functions such as a unified data repository (UDR) for storing data of various network functions.

UE 110 may perform communication through a radio channel formed with a base station (for example, eNB, gNB), that is, through an access network. In some embodiments, the UE 110 may be a device used by a user and configured to provide a user interface (UI). As an example, the UE 110 may be equipment mounted on a vehicle for driving. In other embodiments, the UE 110 may be a device configured to perform machine type communication (MTC), which is operated without the user's intervention, or an autonomous vehicle. In addition to an electronic device, the UE may also be referred to as a "terminal," a "vehicle terminal," a "mobile station," a "subscriber station," a "remote terminal," a "wireless terminal," a "user device," or other terms having equivalent technical senses. In addition to the UE, customer-premises equipment (CPE) or a dongle-type terminal may be used as a terminal device. The CPE may be connected to an NG-RAN node like the UE, and may provide a network to other communication equipment (for example, a laptop).

The AMF 150 may provide a function for managing the access and mobility of each UE 110, and each UE 110 may be connected to a single AMF 150 by default. Specifically, the AMF 150 may perform at least one function selected from signaling between core network nodes for mobility between 3GPP access networks, an interface (N2 interface) between radio access networks (for example, 5G RAN) 120, non-access stratum (NAS) signaling with the UE 110, identification of the SMF 160, and delivering/providing a session management (SM) message between the UE 110 and the SMF 160. Some or all functions of the AMF 150 may be supported within a single instance of one AMF 150.

SMF 160 may provide a session management function and, if the UE 110 has multiple sessions, respective sessions may be managed by different SMFs 160. Specifically, the SMF 160 may perform at least one function selected from session management (for example, session establishment, correction, and release, including maintenance of a tunnel between the UPF 170 and an access network node), selection and control of a user plane (UP) function, traffic steering configuration for routing traffic from the UPF 170 to an appropriate destination, termination of an SM part of an NAS message, downlink data notification (DDN), and an access network (AN)—specific SM information initiator (for example, delivering the same to an access network via the AMF 150 and through an N2 interface). Some or all functions of the SMF 160 may be supported within a single instance of one SMF 160.

In a 3GPP system, conceptual links connecting NFs inside a 5G system may be referred to as reference points. A reference point may also be referred to as an interface. Examples of reference points included in a 5G system architecture expressed in FIG. 1 to FIG. 13 are as follows:

N1: a reference point between the UE 110 and the AMF 150

N2: a reference point between the (R)AN 120 and the AMF 150

N3: a reference point between the (R)AN 120 and the UPF 170

N4: a reference point between the SMF 160 and the UPF 170

N5: a reference point between the PCF 180 and the AF 130

N6: a reference point between the UPF 170 and the DN 140

N7: a reference point between the SMF 160 and the PCF 180

N8: a reference point between the UDM 153 and the AMF 150

N9: a reference point between two core UPFs 170

N10: a reference point between the UDM 153 and the SMF 160

N11: a reference point between the AMF 150 and the SMF 160

N12: a reference point between the AMF 150 and an authentication server function (AUSF) 151

N13: a reference point between the UDM 153 and the AUSF 151

N14: a reference point between two AMFs 150

N15: a reference point between the PCF 180 and the AMF 150 in the case of a non-roaming scenario, or reference point between the PCF 180 and the AMF 150 inside a visited network in the case of a roaming scenario N22: a reference point between the network slice selection function (NSSF) 190 and the AMF 150

Figure 2A:
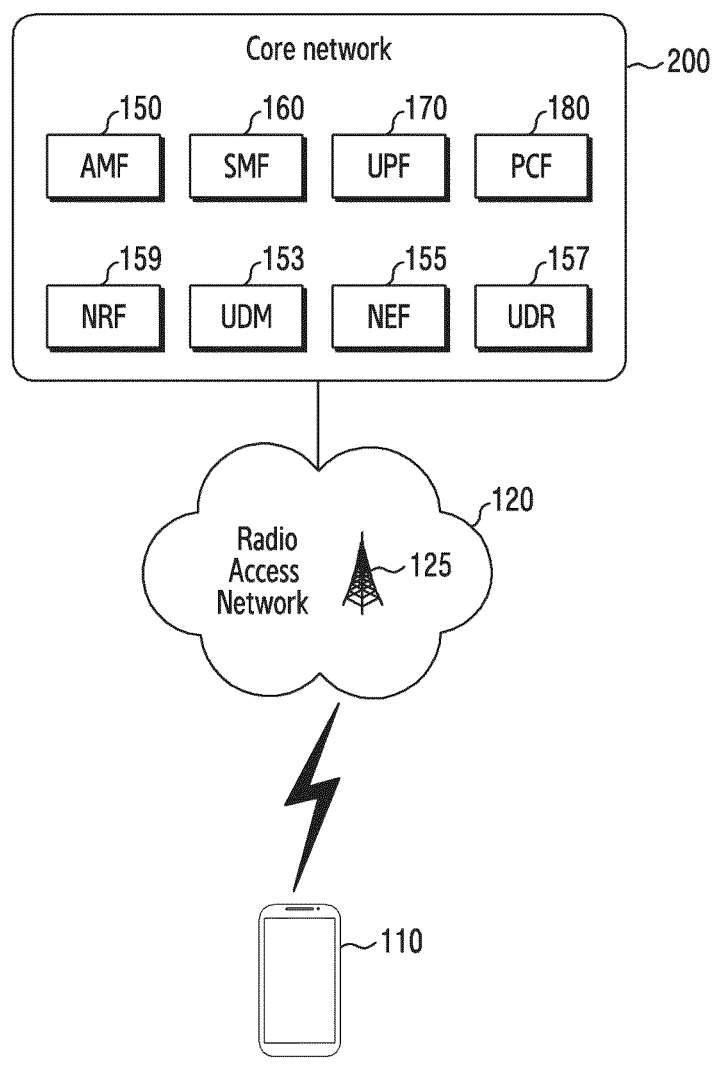
FIG. 2A illustrates a wireless environment including a core network in a wireless communication system, according to an embodiment.

FIG. 2A illustrates a wireless environment including a core network 200 in a wireless communication system, according to an embodiment.

Referring to FIG. 2A, the wireless communication system includes a radio access network (RAN) 120 and a core network (CN) 200.

The RAN 120 is a network directly connected to a user device, for example, a terminal 110, and is an infrastructure for providing the terminal 110 with radio access. The RAN 120 includes a set of multiple base stations, including a base station 125, and the multiple base stations may perform communication through an interface formed therebetween. At least some of interfaces between the multiple base stations may be wired or wireless. The base station 125 may have a central unit (CU) and a distributed unit (DU) separate from each other. In this case, one CU may control multiple DUs. In addition to the base station, the base station 125 may also be referred to as an "access point (AP)", a "next-generation node B (gNB)", a "5th generation node", a "wireless point", a "transmission/reception point (TRP)", or other terms having equivalent technical meanings. The terminal 110 accesses the RAN 120 and performs communication through a radio channel with the base station 125. In addition, the terminal 110 may also be referred to as "user equipment (UE)", a "mobile station", a "subscriber station", a "remote terminal", a "wireless terminal", a "user device", or other terms having equivalent technical meanings.

The core network 200 is a network for managing the entire system, and is configured to control the RAN 120 and process data and control signals regarding the terminal 110 transmitted/received through the RAN 120. The core network 200 performs various functions such as controlling a user plane and a control plane, processing mobility, managing subscriber information, accounting, and interworking with another kind of system (for example, a long-term evolution (LTE) system). In order to perform various functions described above, the core network 200 may include multiple separate entities having different network functions (NFs). For example, the core network 200 may include an access and mobility management function (AMF) 150, a session management function (SMF) 160, a user plane function (UPF) 170, a policy and charging function (PCF) 180, a network repository function (NRF) 159, a user data management (UDM) 153, a network exposure function (NEF) 155, and a unified data repository (UDR) 157.

The terminal 110 is connected to the RAN 120 so as to access the AMF 150 configured to perform the mobility management function of the core network 200. The AMF 150 is a function or a device in charge of both access to the RAN 120 and mobility management of the terminal 110. The SMF 160 is a session-managing NF. The AMF 150 is connected to the SMF 160, and the AMF 150 routes a session-related message regarding the terminal 110 to the SMF 160. The SMF 160 is connected to the UPF 170 so as to allocate a user plane resource to be provided to the terminal 110, and establishes a tunnel for data transmission between the base station 125 and the UPF 170. The PCF 180 controls information related to charging and the policy regarding the session used by the terminal 110. The NRF 159 performs functions of storing information regarding NFs installed in the mobile communication operator network, and providing the stored information. The NRF 159 may be connected to all NFs. Respective NFs register to the NRF 159 when the operator network starts driving, thereby informing the NRF 159 that the corresponding NF is being driven inside the network. The UDM 153 is an NF performing a similar role to a home subscriber server (HSS) of a 4G network, and stores subscription information of the terminal 110 or context used by the terminal 110 inside the network.

The NEF 155 performs a role of connecting a 3$^{rd}$ party server and an NF inside a 5G mobile communication system. In addition, the NEF 155 performs a role of providing data to the UDR 157 or acquiring updates or data. The UDR 157 performs a function of storing subscription information of the terminal 110, storing policy information, storing data exposed to the outside, or storing information necessary for a 3$^{rd}$ party application. In addition, the UDR 157 performs a role of providing stored data to another NE.

The core network 200 may further include a network data analytics function (NWDAF). The NWDAF is one of network functions of a 5G core network control plane, and may provide network data collection and analysis functions. Specifically, the NWDAF may analyze data through an AI technology such as machine learning (ML), based on collected network data, and may provide the analysis result value to other 5G core network functions, thereby optimizing respective network functions and improving the performance. Furthermore, the core network 200 may further include a management data analytics service (MDAS), and the MDAS may generate an analysis report including the current or future expected resource state together with the NWDAF.

Figure 2B:
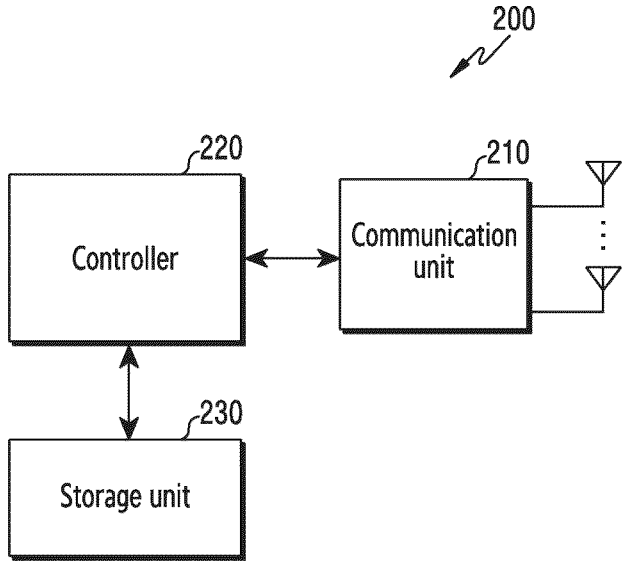
FIG. 2B illustrates the functional configuration of core network entities in a wireless communication system, according to an embodiment.

FIG. 2B illustrates the configuration of core network entities in a wireless communication system, according to an embodiment. The configuration 200 illustrated in FIG. 2B may be understood as the configuration of a device having at least one function from among 150, 151, 153, 155, 157, 160, 170, 180, and 159 in FIG. 1 and FIG. 2. In addition, the configuration 200 illustrated in FIG. 2B may include the configuration of a device having at least one function from among any entities (or nodes) included in the core network 200. As used herein, terms/suffixes such as "unit" and "-er" refer to units configured to process at least one function or operation, and may be implemented as hardware, software, or a combination of hardware and software.

Referring to FIG. 2B, the core network entities include a communication unit 210, a storage unit 230, and a controller 220.

The communication unit 210 provides an interface for communicating with other devices inside the network. That is, the communication unit 210 converts a bit string transmitted from a core network entity to another device into a physical signal, and converts a physical signal received from another device into a bit string. That is, the communication unit 210 may transmit and receive signals. Accordingly, the communication unit 210 may be referred to as a model, a transmitter, a receiver, or a transceiver. The communication unit 210 enables a core network entity to communicate with other devices or systems via backhaul connection (for example, wired or wireless backhaul) or via a network.

The storage unit 230 stores data such as default programs for operations of core network entities, application programs, configuration information, and the like. The storage unit 230 may be configured as a volatile memory, a nonvolatile memory, or a combination of a volatile memory and a nonvolatile memory. The storage unit 230 also provides stored data at the request of the controller 220. The storage unit 230 may store AI-based online learning data and may apply the stored learning data to a neural network structure for AI-based frame type identification.

The controller 220 controls overall operations of the core network entities. For example, the controller 220 transmits/receives signals through the communication unit 210. In addition, the controller 220 records data in the storage unit 230 and reads the same. To this end, the controller 220 may include at least one processor. The controller 220 may control synchronization to be performed by using a wireless communication network. For example, the controller 220 may control core network entities so as to perform operations according to various embodiments described below.

An AI model learned based on a neural network may operate through the controller 220 and the storage unit 230. The controller 220 may include a single processor or multiple processors. The single processor or multiple processors may include a general-purpose processor such as a CPU, an application processor (AP), or a digital signal processor (DSP), a graphic-dedicated processor such as a graphics processing unit (GPU) or a vision processing unit (VPU), or an AI-dedicated processor such as a neural processing unit (NPU). The single processor or multiple processors may control input data to be processed according to a predefined operation rule stored in the storage unit 230 or an AI model. Alternatively, if the single processor or multiple processors are AI-dedicated processors, the AI-dedicated processors may be designed in a hardware structure customized to process an AI model. The AI-dedicated processors may be included as separate components without being included in the controller 220.

The predefined operation rule or AI model is characterized by being made through learning. As used herein, the expression "being made through learning" means that a default AI model is learned by using multiple pieces of learning data by a learning algorithm such that an operation rule or an AI model predefined to perform desired characteristics (or purposes) is made. Such learning may be conducted by the device itself configured to perform AI according to the disclosure, or conducted through a separate server and/or system. Examples of the learning algorithm include supervised learning, unsupervised learning, semi-supervised learning, or reinforcement learning, but are not limited thereto. The controller 220 may learn occurring events, determined assessments, or collected or input information through the learning algorithm. The controller 220 may store such learning results in the storage unit 230 (i.e., a memory).

The AI model may include multiple neural network layers. Each of the multiple neural network layers has multiple weight values, and performs neural network operations through operation results of previous layers and operations between the multiple weights. The multiple neural network layers may have multiple weight values optimized by learning results of the AI model. For example, the multiple weight values may be updated such that loss values or cost values acquired by the AI model during learning processes are reduced or optimized. The artificial neural network may include a convolutional neural network (CNN), a deep neural network (DNN), a recurrent neural network (RNN), a restricted Boltzmann machine (RBM), a deep belief network (DBN), a bidirectional recurrent deep neural network (BRDNN), or deep Q-networks, but are not limited thereto.

The controller 220 may execute an algorithm for performing operations related to AI-based packet-specific frame type identification. An AI model learned to perform operations related to AI-based packet-specific frame type identification may be configured by hardware, may be included as software, or may be configured by a combination of hardware and software. In other words, the controller 220 may include a controller for AI-based packet-specific frame type identification. The controller for AI-based packet-specific frame type identification may perform an assessment regarding whether or not to monitor the AI model for performing AI-based packet-specific frame type identification, an assessment regarding whether or not to report the monitoring result, an assessment regarding whether the AI model for performing AI-based packet-specific frame type identification has failed or not, or an assessment regarding whether or not to use the AI model for AI-based packet-specific frame type identification. Alternatively, the controller 220 may include an update unit. The update unit may acquire pieces of data updated through a learning procedure between a terminal and a base station, and may reconfigure values of parameters (for example, neural network structures, node layer-specific information, and inter-node weight information) constituting a neural network, based thereon. The update unit and the controller for AI-based packet-specific frame type identification may be a set of instructions or codes stored in the storage unit 230, particularly, instructions/codes residing in the controller 220 at least temporarily, or may be a storage space in which instructions/codes are stored, or may be a part of circuitry constituting the controller 220. The controller 220 may control various entities of the core network to perform operations according to various embodiments.

The configuration of core network entities illustrated in FIG. 1 to FIG. 2B is only an example, and the example of network entities that perform various embodiments of the disclosure is not limited to the illustrated configuration. That is, according to various embodiments, some components may be added, deleted, or modified.

Hereinafter, the disclosure will be described with reference to an AI model included in a user plane function (UPF) or an artificial intelligence management function (AIMF) for convenience of description. That is, an AI model which includes a specific neural network structure, and which is learned by a specific algorithm, may be included in a network function entity. However, the disclosure is not limited thereto, and is also applicable to an AI model included in other network nodes or base stations.

According to an embodiment, a technology related to AI-based packet-specific frame type classification may include a step of learning and configuration, based on a specific algorithm, in order to apply the process or result of packet-specific frame type identification to a specific AI model, a step of collecting learning data needed by the specific AI model during a learning process, and a step of verifying the performance of the learned specific AI model. Particularly, the disclosure may further include, in relation to the step of verifying and applying the performance of the learned specific AI model, a step in which a UPF identifies a packet frame type by monitoring and applying an AI model, thereby performing packet-specific frame type identification through an optimal AI model.

Figure 3:
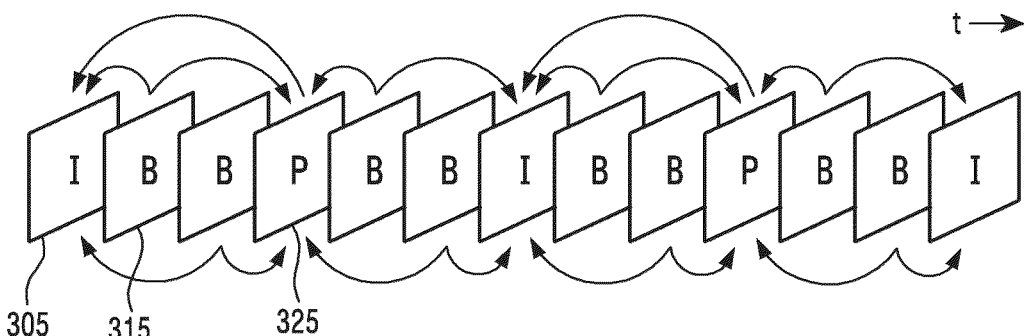
FIG. 3 illustrates an example of I/P/B (as described below) frame types, according to an embodiment.

FIG. 3 illustrates an example of I/P/B frame types of packets, according to an embodiment. Referring to FIG. 3, an example of group of pictures (GOP) for video compression is illustrated.

Referring to FIG. 3, the GOP may include a set of frames for video compression (for example, video coding) technology. The GOP may include three kinds of frames, including an intra-frame (I-frame) 305, a prediction frame (P-frame) 325, and a bi-directionality frame (B-frame) 315, respectively.

The I-frame 305 may include a complete and independent frame which is not dependent on any frame for rendering. That is, the I-frame 305 may include a frame which may be coded by using only information inside the frame, and which is spatially coded without reference information of another frame (not temporally compressed). For example, the I-frame 305 is closest to the original and thus has a high image-quality performance, but may require a very large capacity.

The P-frame 325 may include a frame which may be rendered by using a previous frame, and which is stored by predicting (for example, forward prediction) data of a changed part with reference to the previous frame. Therefore, the P-frame 325 may have a smaller capacity and a higher compression ratio than the I frame 305, but may have a lower level of image-quality performance.

The B-frame 315 may include a frame which provides a higher compression ratio with reference to previous and preceding frames. The B-frame 315 may predict (for example, bidirectional prediction) the movement of data with reference to respective frames between the I-frame 305 and the P-frame 325. Therefore, the B-frame 315 has the smallest capacity and a high compression ratio, but may have the lowest level of image-quality performance. For example, the more B-frames are included, the smaller the capacity of packets related to media, the lower the image quality, and the more burden on decoding.

As described above, the packet compression and performance may vary depending on the ratio of each frame included in the GOP. In addition, a core network entity configured to provide traffic to a base station or a terminal may adaptively apply a QoS flow according to the performance by distinguishing the frame type of each packet of the traffic, in order to provide an efficient service. For example, the relatively important I-frame 305 may be mapped to a QoS flow of a guaranteed bit rate (GBR) type, which guarantees a high quality, and the P-frame 325 or the B-frame 315, which has a lower degree of importance than the I-frame 305, may be mapped to a non-GBR type QoS flow. Therefore, a detailed scheme will hereinafter be described, wherein respective frame types of traffic (for example, XR traffic) of core network entities can be identified and classified, for efficient traffic transmission.

Figure 4:
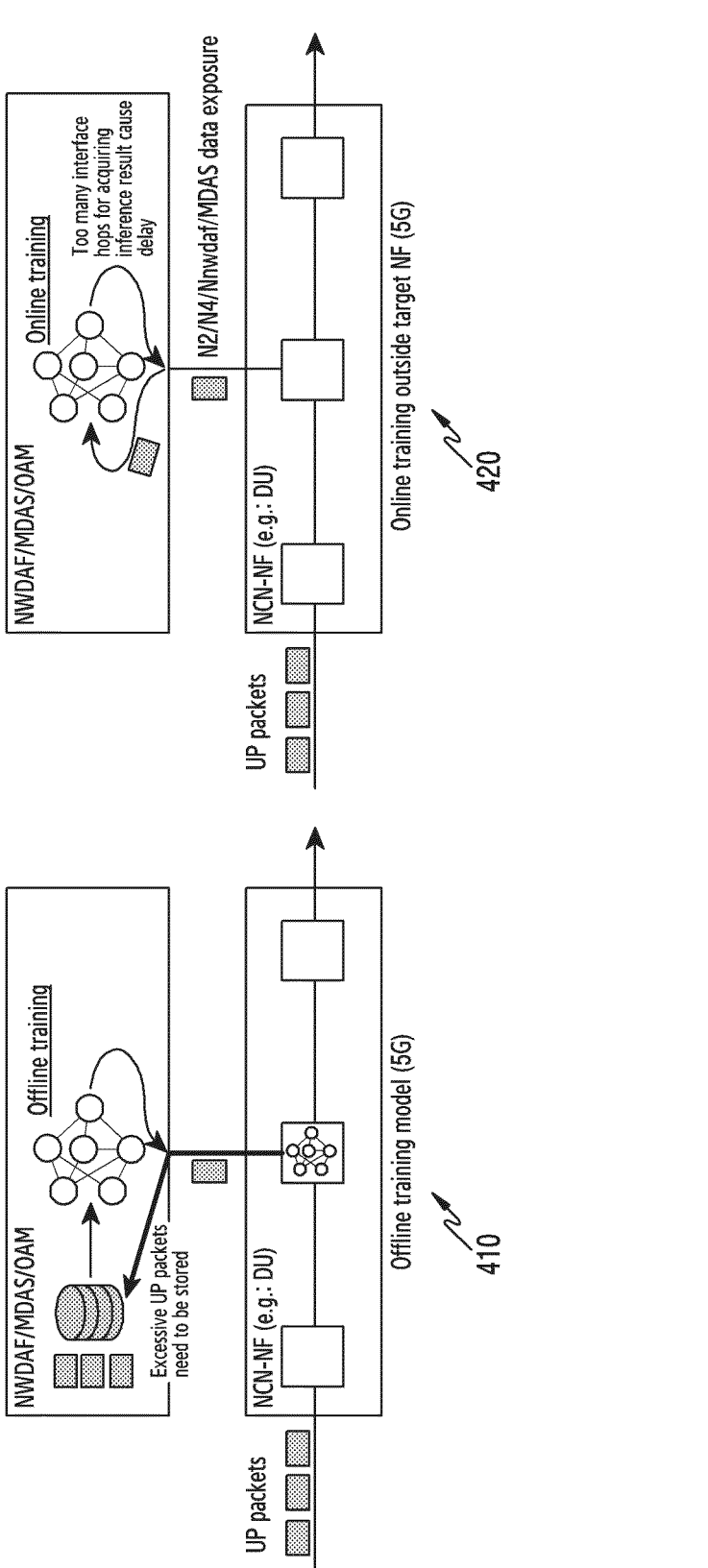
FIG. 4 illustrates an example of offline training for identifying packet frame types and online training outside target entities, according to an embodiment.

FIG. 4 illustrates an example of offline training for identifying packet frame types and online training outside target entities, according to an embodiment. An example in which I/P/B frame types are classified from traffic, based on an AI model, will be described with reference to FIG. 4.

As described above, an NF inside a core network may identify frame types of traffic for the sake of efficient QoS application and packet transmission. An operation of identifying the frame type of real time transport protocol (RTP)—related packets of traffic for an XR service will hereinafter be described, but this is only an example, and may obviously include any packets for transmitting traffic for various services, including XR, or traffic-related data. The frame type of RTP-related packets may be identified as at least one combination of information included in the RTP header or information included in the RTP payload header. However, traffic security-related requirements have increased in line with development of wireless communication technologies, and an RTP-related packet may include an encrypted RTP (for example, secured RTP). However, in the case of an encrypted packet, core network entities may fail to identify the payload header of the RTP packet as long as specific information related to encryption cannot be received further. In addition, if an RTP packet is transmitted based on a hypertext transfer protocol (HTTP), core network entities may fail to identify the header of the RTP packet. Therefore, upon receiving encrypted packets, core network NFs may fail to identify the frame type of each packet, and this may make efficient QoS flow mapping and traffic transmission difficult.

In order to identify the frame type of an encrypted packet, an AI model-based packet-specific frame type identification scheme may be considered. In order to identify frame types, the AI model may use information included in the packet header as input data. The information included in the packet header may include at least one of the header size, the header reception interval, RTP header information (which includes information including the destination address and the like, for example, and which may be unavailable depending on the encryption situation), or the GOP format. For example, the information included in the packet header may include information regarding the packet header in the GOP. The input data may include at least one of information regarding the packet header, information regarding packet statistics, or information regarding encoding. The AI model may generate types of frames included in respective packets as inference results, based on an AI algorithm and input data. As such, core network NFs may use an AI model such that, even if packets include an encrypted payload or HTTP transmission payload, the same can identify the frame type of each packet through packet header information and learning based thereon. That is, core network NFs may identify the type of frames of encrypted RTP-based packets and may differentially apply the QoS accordingly.

Referring to FIG. 4, an AI model learning method for identifying frame types may include online training and offline training.

Offline training 410 model may have a preexisting standardized AI model which has completed learning already. In order to identify frame types based on an offline training model, a next generation core network-network function (NCN-NF) (including a general NF such as a UPF and a base station's CU or DU) may transmit a received user plane packet to an NWDAF, MDAS, or operation administration maintenance (OAM) for network analysis. A standardized AI model is used for offline training, and the standardized AI model may have difficulty in responding to parameters received by the NF in real time. For example, in order to apply an encoding parameter (for example, a quantization parameter (QP) for data compression) to the AI model, the standardized AI model needs to separately provide a new encoding parameter to the NF, and the new encoding parameter needs to be determined by another NF, thereby making it difficult to quickly change according to the AI model training. In addition, the NWDAF or the like which uses the offline training model needs to store packets for the AI model, and an excessive storage space such as a repository (for example, UDR) for packet storage may be further necessary, or a delay may be caused thereby. Specifically, in the case of an offline training model 410, if all user plane packets for the purpose of training and inference are stored in a database inside the NWDAF, MDAS, or OAM, there may be a burden on the storage space. If only some packets are store therein, the AI model may have a degraded performance due to insufficient training data or training based on partial data.

The online training model 420 may have an AI model for frame type identification, which is trained or updated in real time (for example, continuously). Specifically, if the AI model performs online training with regard to each packet or with regard to each bundle of a predetermined packet, model training adaptive to a change in encoding parameters may be possible. However, referring to FIG. 4, if online training is performed (420) outside (for example, NWDAF or DAF) of the target NF related to frame type identification, inefficiency may occur in terms of receiving input data and forwarding inference results. For example, the target NF needs to transmit a user plane packet to the NWDAF, MDAS, or OAM in order to obtain inference regarding frame type identification, and the inference may be delayed through unnecessary interface hops (for example, N2/N4/ Nnmwdaf/MDAS data exposure or the like) during such a packet transmitting/receiving process. In addition, if the NWDAF, MDAS, or OAM is in charge of online training without a dedicated function for controlling and managing the AI model for online training, online training instability management may not be performed efficiently because there is no separate interface for delivering training performing environment information and controlling training.

As described above, in order to efficiently identify and classify frame types with regard to respective traffic packets, various embodiments including an online training AI model included (for example, embedded) in the target NF and a structure including a separate AI management function for monitoring or managing the same will be described hereinafter.

Figure 5:
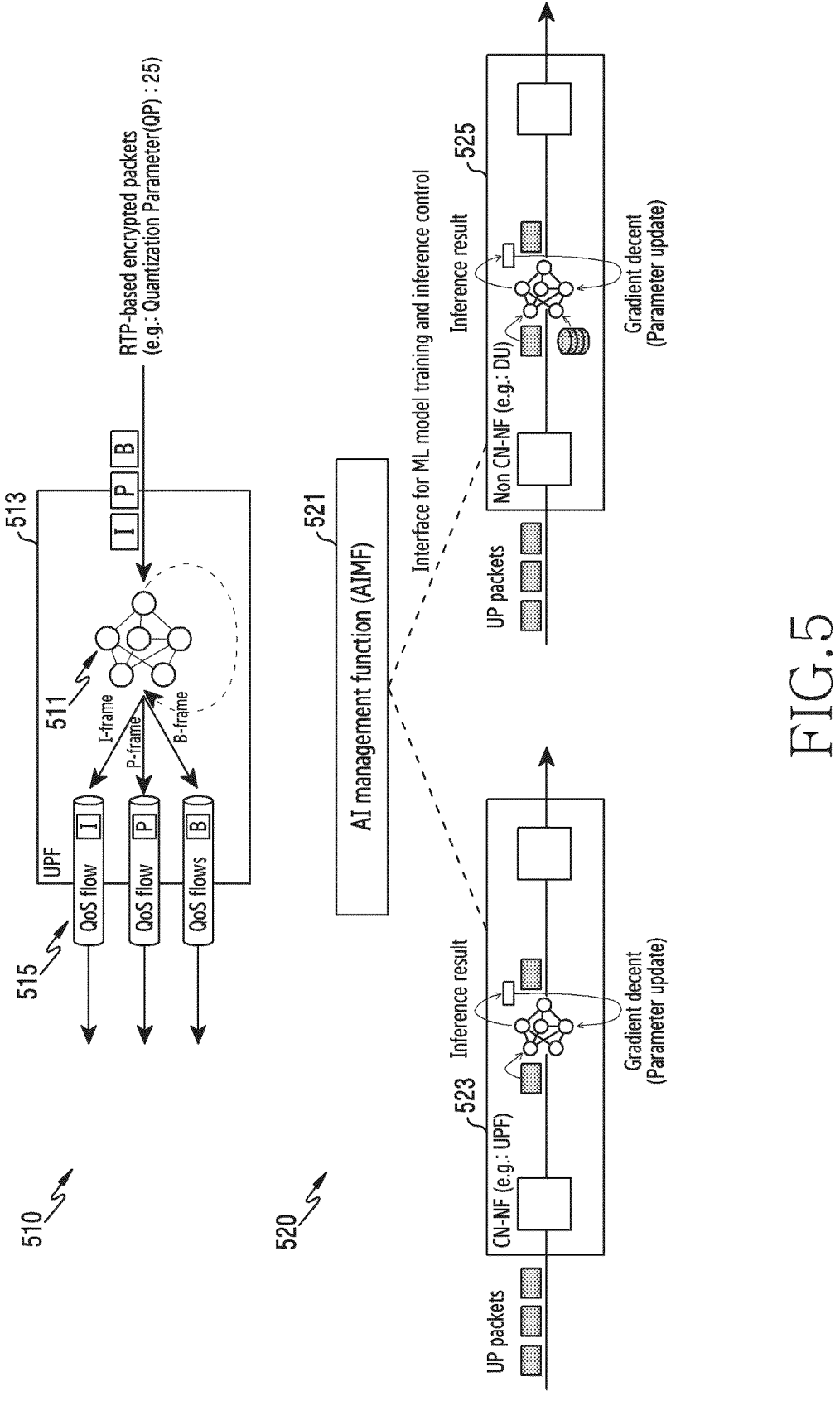
FIG. 5 illustrates the structure of a user plane function (UPF) having an artificial intelligence (AI) model embedded therein for online training and an AI management function, according to an embodiment.

FIG. 5 illustrates the structure of a user plane function (UPF) having an artificial intelligence (AI) model embedded therein for online training and an AI management function, according to an embodiment. Specifically, FIG. 5 illustrates a structure 510 in which the UPF 513 identifies frame types, based on online training AI model 511 encryption packets, and applies QoS at 515, and a structure 520 further including an AI management function (AIMF) 521 for managing the AI model included in an NE.

In particular, FIG. 5 illustrates a UPF as an NF having an AI model embedded therein so as to identify packet frame types, but this is only an example, and the same may include any NF configured to process packets by using an AI model, without being limited thereto. In addition, the AIMF 521, which is an entity for managing the AI model, is illustrated as a separate entity, but this is only an example, and the AIMF 521 may include entities included in other network entities, such as an OAM and an NWDAF, so as to perform functions, without being limited thereto.

In order to efficiently identify frame types with regard to traffic packets, the online training AI model 511 may be embedded in a UPF 513 for identifying packet-specific frame types and applying QoS. The UPF 513 may receive RTP-based packets, and may identify encrypted packets and unencrypted packets among the same. The AI model 511 embedded in the UPF 513 may acquire inference results by using encrypted packet header information or the like as input data. The AI model 511 may include a real-time online training AI model which is learned adaptively to encoding parameters, and inference results may include respective packet's frames' type. The UPF 513 may map respective packets and a QoS flow corresponding to the frame type of respective packets, based on inference results. The online training AI model 511 embedded in the UPF may make it possible to identify, even in the case of an encrypted packet, the frame type efficiently without delay or requiring any unnecessary storage space, by using only packet header information (for example, the header size, the header reception interval, the GOP format (for example, information regarding the header of the packet in the GOP), and the like). The input data may include at least one of information regarding the packet header, information regarding packet statistics, or information regarding encoding.

Referring to FIG. 5, various embodiments may further include an AIMF 521 for managing an AI model embedded in an NF (for example, including a core network's UPF or a base station's CU or DU) configured to identify frame types. The core network's UPF 523 or the base station's DU 525 may be connected to the AIMF by an interface for ML model training and inference control.

In line with development of wireless communication systems, a structure may be introduced, in which various AI technologies are applied to all entities, based on an AI-native environment. Particularly, in the case of an AI aimed at utilizing user planes, models based on real-time inference and online training may be considered efficient, and there may be a need for an AI Model which is trained and inferred in a streaming type without separately storing user plane packets. In addition, in the case of a fully service-based architecture (SBA) structure, the CU or DU included in the base station may also be an NF, and may include an online training AI model. In the above-described environment, the AI model included in the DU 525 of the base station or the UPF 523 may train received user plane packets in real time, and such a parameter update method may be performed according to various algorithms including a gradient descent algorithm. In addition, the DU 525 of the base station or the UPF 523 may be managed or controlled by the AIMF 521 in order to apply a more precise and efficient AI model.

Figure 6:
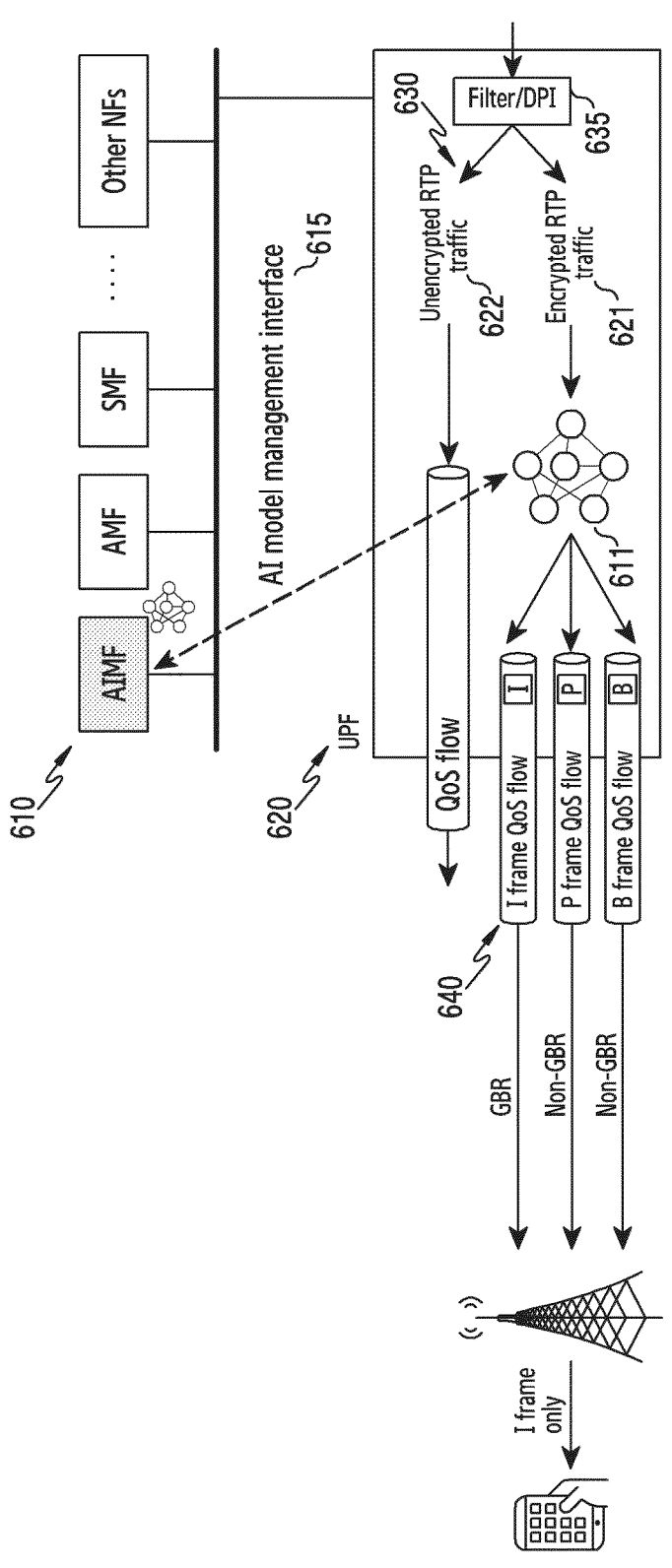
FIG. 6 illustrates a structure for classifying frame types of traffic packets of a UPF having an AI model embedded therein, according to an embodiment.

FIG. 6 illustrates a structure for classifying frame types of traffic packets of a UPF having an AI model embedded therein, according to an embodiment. Specifically, FIG. 6 illustrates an example in which a UPF 620 having an online training model embedded therein receives traffic, identifies packet-specific frame types, and applies QoS 640.

More specifically, the online training AI model 611 may be positioned behind a 5G QoS identifier (5QI) filter of the UPF 620 or an Internet protocol (IP)-based packet filtering function (hereinafter, simply referred to as a filter) including deep packet inspection (DPI) 635. The online training AI model 611 may also be connected to an AIMF 610 for managing or controlling the AI model by an AI model management interface 615. The AIMF 610 may be a separate entity, or a function included in the OAM. In addition, the AI model management interface 615 may include an interface performing an identical or similar function.

The filter 635 of the UPF 620 may identify whether there is encrypted traffic or packet among RTP-based streaming traffic at 630. The UPF 620 may identify whether the RTP-based traffic is encrypted at 621, based on whether the same uses a secure real-time transport protocol (SRTP) or hypertext transfer protocol (HTTP).

The UPF 620 may transmit encrypted traffic 621 to the online training AI model 611. The AI model of the UPF 620 controlled or managed by the AIMF 610 may infer the type of traffic frames by using header information of the encrypted traffic as input data. The input data related to the AI model may include the packet size, the packet arrival interval, the encoding algorithm, the marker, and the like, and the output data (inference result) may include a frame classifier. For example, information included in the packet header may include information regarding the packet header in the GOP. The input data may include at least one of information regarding the packet header, information regarding packet statistics, or information regarding encoding. The UPF 620 may display the result of distinguishing packet frame types, based on the inference result, and may map a QoS corresponding to each frame type of the packet. For example, in view of the requested compression ratio and transmission rate, the UPF 620 may map an I-frame which is necessary for real-time playback, among frame types, to the GRB-type QoS flow, thereby preferentially transmitting the I-frame. Accordingly, in a radio resource situation in which it is impossible to transmit all frames, the terminal may preferentially receive the I-frame and adaptively consume real-time VR or XR content of an image quality conforming to the radio environment.

The UPF 620 may identify unencrypted traffic frame types regardless of the AI model. In the case of unencrypted traffic 622, the UPF may identify both information that the traffic header includes and information that the payload header includes, and thus may identify frame types regardless of the AI algorithm, thereby mapping QoS flows.

As described above, in order to identify encrypted traffic frame types, the UPF having an AI model embedded therein may perform real-time inference through online AI model training. Furthermore, in the case of a fully SBA, not only the UPF, but also the DU or CU has an AI model embedded therein, thereby performing efficient and adaptive traffic processing.

Figure 7:
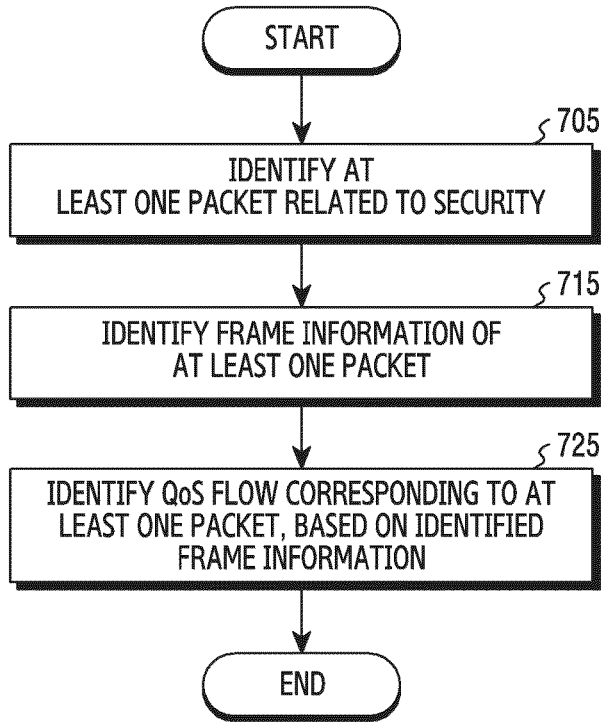
FIG. 7 illustrates a flow of operations for classifying frame types of traffic packets of a UPF having an AI model embedded therein, according to an embodiment.

FIG. 7 illustrates a flowchart of operations for classifying frame types of traffic packets of a UPF having an AI model embedded therein, according to an embodiment. Specifically, FIG. 7 illustrates a flowchart of operations in which a UPF receives traffic and classifies frame types of traffic packets by using an online training AI model. According to an embodiment, the series operations illustrated in FIG. 7 may include the embodiments described with reference to FIG. 3 to FIG. 6. Entities, information, and the like described in the disclosure are only examples, which are not limiting, and may obviously include any entity having an AI model embedded therein in order to process traffic, including any packet traffic including XR traffic, or a UPF.

In step 705, the UPF may identify at least one packet related to security. Specifically, the UPF may receive traffic (for example, including XR traffic or RTP traffic) for providing a service, and may identify whether the received traffic has an encrypted packet. A filter included in the UPF may identify a packet that uses an RTP protocol is an RTP packet to which a security technology has been applied. The UPF filter may identify whether RTP-based traffic is encrypted, based on whether the same uses SRTP or HTTP. When identifying at least one packet related to security, the UPF filter may be positioned before an AI model for frame classification. The filter included in the UPF may include an IP-based packet filtering function including a DPI or a 5QI filter.

In step 715, the UPF may identify frame type information of at least one packet. In the case of encrypted traffic, the UPF may use an embedded AI model in order to identify the packet frame type. The AI model included in the UPF may further transmit/receive signaling for AI model management with an AIMF connected by an AI model management interface before, after, or concurrently with step 715. The detailed operation process between the UPF and the AIMF for AI model management will be described in more detail with reference to FIG. 8 to FIG. 13.

In the case of encrypted traffic, the UPF cannot identify payload header information of packets, and thus may be unable to identify the type of traffic frames. Therefore, the UPF may identify the type of frames by using the embedded AI model and information that the traffic header includes. The UPF may transmit encrypted traffic to the embedded online training AI model. The AI model of the UPF controlled or managed by the AIMF may infer the type of traffic frames by using the header information of encrypted traffic as input data. The input data related to the AI model may include the packet size, the packet arrival interval, the encoding algorithm, the marker, and the like, and the output data (inference result) may include a frame classifier which is classified into an I-frame, a P-frame, and a B-frame. For example, information included in the packet header may include information regarding the packet header in the GOP. The input data may include at least one of information regarding the packet header, information regarding packet statistics, or information regarding encoding. The online training AI model of the UPF may perform AI model (de)activation, backup, update, monitoring, or the like through signaling with the AIMF, which will be described in more detail with reference to FIG. 8 to FIG. 13.

If traffic is identified as not being encrypted, the UPF may identify the type of frames of the unencrypted traffic regardless of the AI model. In the case of unencrypted traffic, the UPF may identify both information that the traffic header includes and information that the payload header includes, and thus may identify frame types regardless of the AI algorithm.

In step 725, the UPF may identify a QoS flow corresponding to at least one packet, based on identified frame type information. Specifically, the UPF may display the packet frame type distinction result, based on the identification or inference result, and may map a QoS flow corresponding to each frame type of the packet. The UPF may apply QoS to each packet, based on the identification or inference result. For example, in view of the required compression ratio and transmission rate, the UPF may map an I-frame which is necessary for real-time playback, among identified traffic frames, to a GBR-type QoS flow, thereby preferentially transmitting the I-frame. Accordingly, in a radio resource situation in which it is impossible to transmit all frames, the terminal may preferentially receive the I-frame and adaptively consume real-time VR or XR content of an image quality conforming to the radio environment. However, this is only an example and is not limiting, and the UPF may obviously apply any QoS adaptively according to each frame type of the packet.

Figure 8:
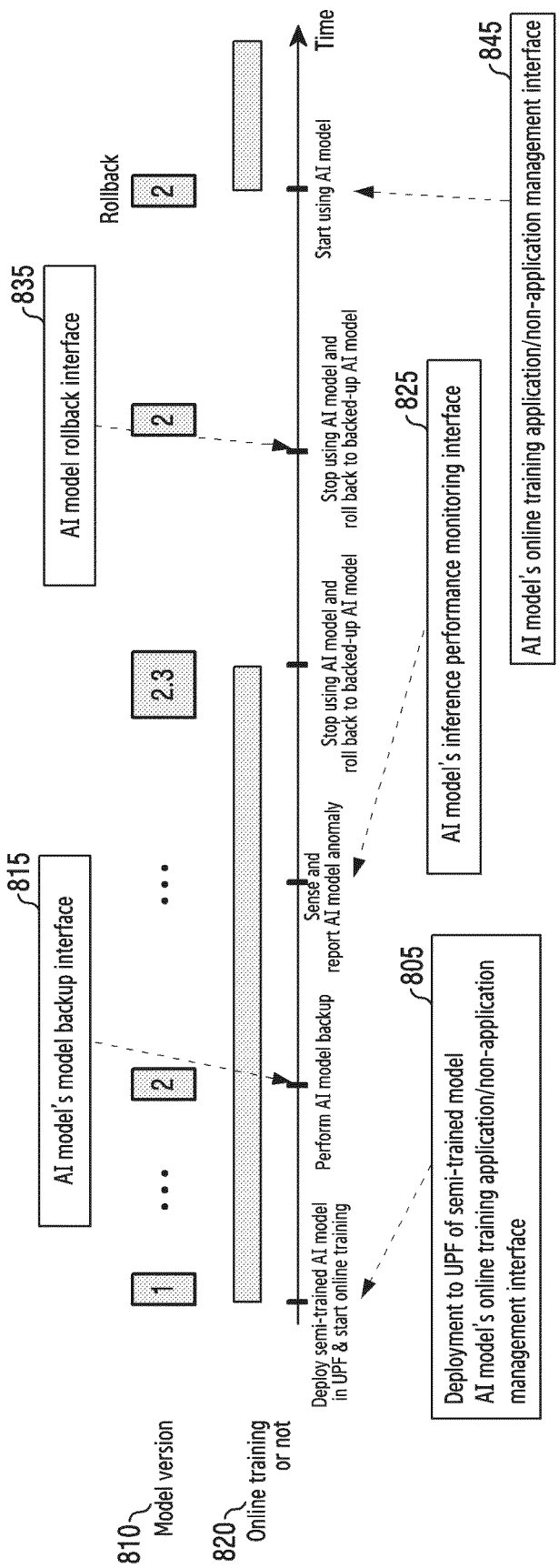
FIG. 8 illustrates a flow of operations for managing a UPF having an AI model embedded therein, by an AI management function, according to an embodiment.

FIG. 8 illustrates an example of a flow of operations for managing a UPF having an AI model embedded therein, by an AI management function, according to an embodiment. Specifically, FIG. 8 illustrates an example of operations based on signaling between an AI model that a UPF includes, and an AIMF that manages the AI model.

Referring to FIG. 8, as the AI model that the UPF includes performs learning or online training 820, the model version 810 may be updated. As the online training 820 continues, the model version 810 may increase. However, the increase in the model version, as used herein, means that the AI model is newly updated, and does not necessarily mean that the AI model has an improved performance. In addition, respective steps illustrated in FIG. 8 are not mandatory, and various embodiments may include all, some, or a combination of some thereof.

A semi-trained AI model may be deployed (805) in the UPF. The semi-trained AI model may be an AI model including a default value corresponding to a specific degree of learning. However, this is not limitative, and the AI model deployed in the UPF may obviously include not only the semi-trained AI model, but also a default AI model which has not started learning. The UPF may deploy an AI model, based on signaling of the AIMF that manages the AI model.

The UPF may activate or deactivate at 805 online training of the AI model, based on the deployed AI model. The UPF may activate or deactivate online training of the AI model, based on an instruction from the AIMF that manages the AI model.

As illustrated in FIG. 8, the UPF having an AI model deployed therein may activate online training of the AI model, and the AI model of the UPF may start online training. The UPF may process traffic through the embedded AI model (for example, identify the frame type, based on traffic header information), and may not transmit traffic received from separate external entities, including the AIMF. Specifically, the AI model may learn the UPF's traffic processing result as a new input value, thereby updating the AI model's version in real time.

The UPF may perform backup at 815 of the online trained AI model. The UPF may back up the online training version of the AI model, based on a request (for example, a trigger) of the AIMF that manages the AI model. While the AI model performs real-time training, the UPF and the AIMF may monitor the AI model of the UPF periodically or based on a trigger, and may perform AI model backup, based on the monitoring result. If a specific condition is satisfied based on the AI model monitoring result, the UPF and the AIMF may back up the online training version of the AI model. The specific condition may include at least one of a case in which the performance based on the AI result value is greater than or equal to a predetermined value, a case in which a predefined time has elapsed, or a case in which the performance of the UPF or the AI model itself is greater than or equal to, or less than or equal to a predetermined value.

The UPF may store the AI model determined to be backed up as a file, and may store information regarding the state at the backup timepoint (for example, timestamp, inference performance).

The UPF may monitor at 825 the online trained AI model. While the AI model performs real-time training, the UPF and the AIMF may monitor the AI model of the UPF periodically or based on a trigger, and may sense an anomaly of the AI model performance or the like, based on the monitoring result. Upon sensing an anomaly of the AI model, based on the monitoring result, the UPF may stop online training of the AI model. The UPF may then deactivate online training of the AI model. The UPF may monitor the state of the AI model, based on subscription (for example, request or trigger) of the AIMF that manages the AI model.

The UPF may roll back at 835 the online trained AI model to another version of AI model. The UPF may roll back the AI model version, based on a trigger of the AIMF that manages the AI model, or a predefined condition.

The UPF may resume online training at 845, based on the rolled-backed AI model version. The UPF may roll back to the backed-up AI model version and resume online training. The UPF may reactivate online training of the AI model, and the AI model may start online training, based on the rolled-back AI model version.

As described above, the UPF may use an embedded AI model to classify frames from traffic packets, and may variously manage the AI model in order to train the AI model more efficiently and precisely. Hereinafter, FIG. 9 to FIG. 13 illustrate a detailed flow of signals between the AIMF and the UPF for managing the AI model that the UPF includes. In addition, the steps illustrated in FIG. 9 to FIG. 13 may be performed before, after, or concurrently with step 715 in FIG. 7. Obviously, these are not considered necessary components, and it is also possible to perform some or a combination of some thereof.

Figure 9:
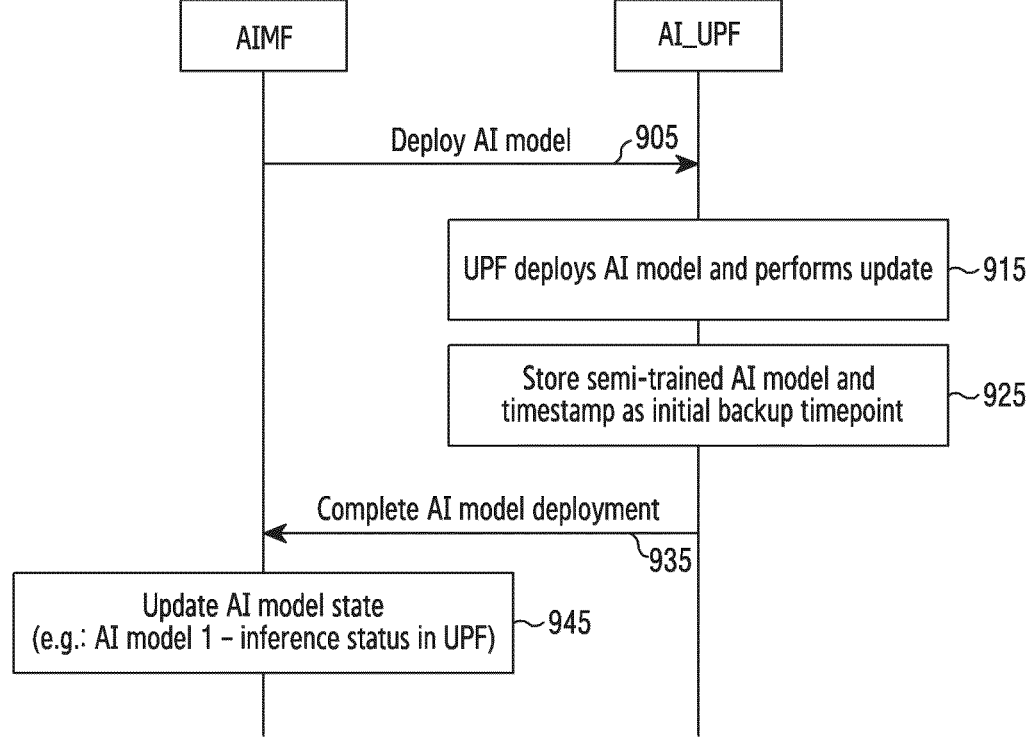
FIG. 9 illustrates a flow of signals for deploying an AI model by an AI management function and a UPF having an AI model embedded therein, according to an embodiment.

FIG. 9 illustrates a flow diagram of signals for deploying an AI model by an AI management function and a UPF having an AI model embedded therein, according to an embodiment. Specifically, detailed operations in which a UPF transmits/receives signals with an AIMF in order to deploy an AI model will be described with reference to FIG. 9.

In step 905, the AIMF may request the UPF to deploy an AI model. The request for AI model deployment may include various signals, such as a request message or specific information. The AI model that the AIMF requests the UPF to deploy may include a semi-trained AI model. The semi-trained AI model may be an AI model including a default value corresponding to a specific degree of learning. However, this is not limiting, and the AI model deployed in the UPF may obviously include not only the semi-trained AI model, but also a default AI model which has not started learning.

In step 915, the UPF may deploy an AI model and perform an update. If the UPF already includes an AI model, the UPF may update the AI model included therein.

In step 925, the UPF may store information regarding the semi-trained AI model as a backup timepoint (for example, backup point). The information regarding the semi-trained AI model stored by the UPF may include at least one of information regarding the state of the AI model that the UPF deploys, information regarding performance, or information regarding a timestamp.

In step 935, the UPF may notify the AIMF of AI model deployment completion. The AI model deployment completion may be transmitted through various signals, such as a response message, specific information, or the like.

In step 945, the AIMF may update the state of the AI model that the UPF includes. For example, the AIMF may update the version information of the AI model that the UPF includes currently to "AI model 1-inference status in UPF". However, this is only an example, and the AI model state updated by the AIMF may obviously include various update operations meaning synchronization with the state of the AI model that the UPF includes.

As described above, upon deploying an AI model, the UPF may determine whether or not to activate online training of the AI model.

Figure 10:
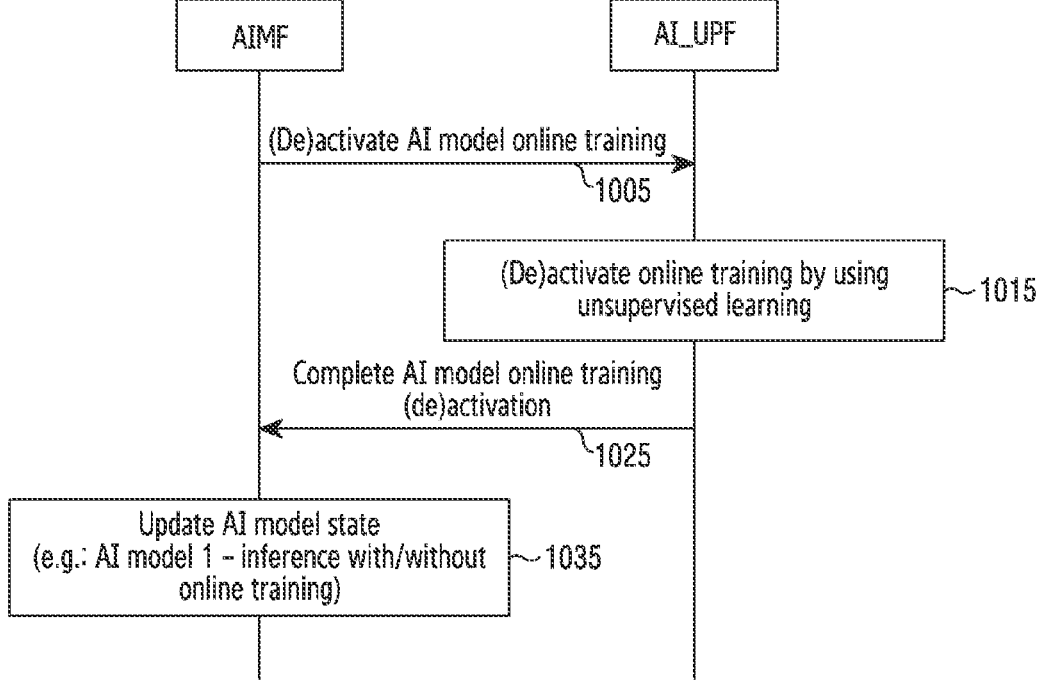
FIG. 10 illustrates a flow of signals for activating an AI model by an AI management function and a UPF having an AI model embedded therein, according to an embodiment.

FIG. 10 illustrates a flow diagram of signals for activating an AI model by an AI management function and a UPF having an AI model embedded therein, according to an embodiment. Specifically, detailed operations in which a UPF transmits/receives signals with an AIMF in order to activate or deactivate online training of an AI model will be described with reference to FIG. 10.

In step 1005, the AIMF may transmit information instructing activation or deactivation of AI model online training to the UPF. In order to practice AI model online training, the AIMF may instruct the UPF having an AI model deployed therein to activate AI model online training. Alternatively, when rolling back the AI model of the UPF to a backed-up AI model, the AIMF may instruct the UPF having the AI model deployed therein to activate AI model online training, in order to deploy the backed-up AI model and to resume online training. If online training needs to be stopped because the AI model's performance has decreased, for example, while monitoring the AI model of the UPF, the AIMF may instruct the UPF to deactivate AI model online training.

In step 1015, the UPF may activate or deactivate AI model online training by using unsupervised learning. However, this is only an example, and the UPF may perform online training through various learning algorithms including unsupervised learning. The UPF may activate or deactivate AI model online training, based on an instruction from the AIMF. The UPF having an AI model deployed therein may activate online training of the AI model, and the AI model of the UPF may start online training. The UPF may process traffic through the embedded AI model (for example, identify frame types based on traffic header information), and may not transmit received traffic to separate external entities including the AIMF. Specifically, the AI model may learn the UPF's traffic processing result as a new input value, thereby updating the AI model's version in real time.

In step 1025, the UPF may inform the AIMF whether AI model online training is activated or deactivated. Various signals such as a response message or specific information may be transmitted to inform whether AI model online training is activated or deactivated.

In step 1035, the AIMF may update the state of the AI model that the UPF includes. For example, the AIMF may update the version information of the AI model that the UPF includes currently to "AI model 1-online training activation/deactivation inference state". However, this is only an example, and the AI model state updated by the AIMF may obviously include various update operations meaning synchronization with the state of the AI model that the UPF includes.

As described above, upon activating or deactivating AI model online training, the UPF may perform or stop AI model online training. In addition, the state or version of the AI model of the UPF may be continuously updated as online training proceeds.

Figure 11:
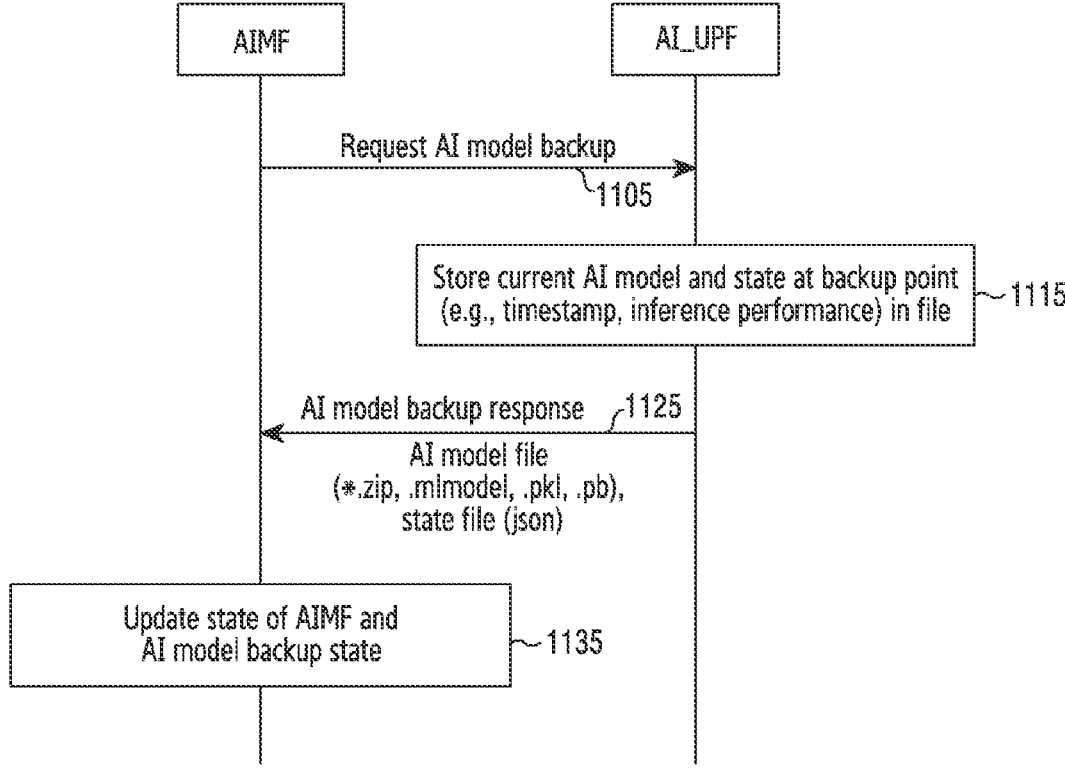
FIG. 11 illustrates a flow of signals for backing up an AI model by an AI management function and a UPF having an AI model embedded therein, according to an embodiment.

FIG. 11 illustrates a flow diagram of signals for backing up an AI model by an AI management function and a UPF having an AI model embedded therein, according to an embodiment. Specifically, detailed operations in which a UPF transmits/receives signals with an AIMF in order to back up an AI model will be described with reference to FIG. 11.

In step 1105, the AIMF may request the UPF to back up an AI model. The request for AI model backup may include various signals such as a request message or specific information. While the AI model performs real-time training, the UPF and the AIMF may monitor the AI model of the UPF periodically or based on a trigger. The detailed operation for monitoring the AI model may include the operations illustrated in FIG. 12. The AIMF may request backup of the AI model, based on the monitoring result. If a specific condition is satisfied based on the AI model monitoring result, the AIMF may request the UPF to back up the AI model. The specific condition may include at least one of a case in which the performance based on the AI result value is greater than or equal to a predetermined value, a case in which a predefined time has elapsed, or a case in which the performance of the UPF or the AI model itself is greater than or equal to, or less than or equal to a predetermined value.

According to various embodiments, the UPF may back up the current AI model, based on a preconfigured condition, even without an AI model backup request from the AIMF in step 1105. The condition preconfigured for the UPF may include at least one of a case in which the performance based on the AI result value is greater than or equal to a predetermined value, a case in which a predefined time has elapsed, or a case in which the performance of the UPF or the AI model itself is greater than or equal to, or less than or equal to a predetermined value.

In step 1115, the UPF may store the current (that is, backup timepoint) AI model and the state at the backup timepoint. Based on a request (for example, trigger) of the AIMF that manages the AI model, the UPF may back up the online training version of the AI model. The UPF may store the AI model determined to be backed up as a file, and may store information regarding the state at the backup timepoint (for example, timestamp, inference performance).

In step 1125, the UPF may transmit a response of AI model backup to the AIMF. The response of AI model backup may be transmitted through various signals such as a response message or specific information. The UPF may transmit a file including information regarding the AI model or a file including backup-related information to the AIMF. The file is not limited to any specific format, and may include any format of files.

In step 1135, the AIMF may update AI model information regarding backup of the AI model of the UPF information regarding the state. However, this is only an example, and the AI model state updated by the AIMF may obviously include various update operations meaning synchronization with the state of the AI model that the UPF includes.

As described above, the UPF may perform AI model backup if triggered by the AIMF, or if a specific condition is satisfied.

Figure 12:
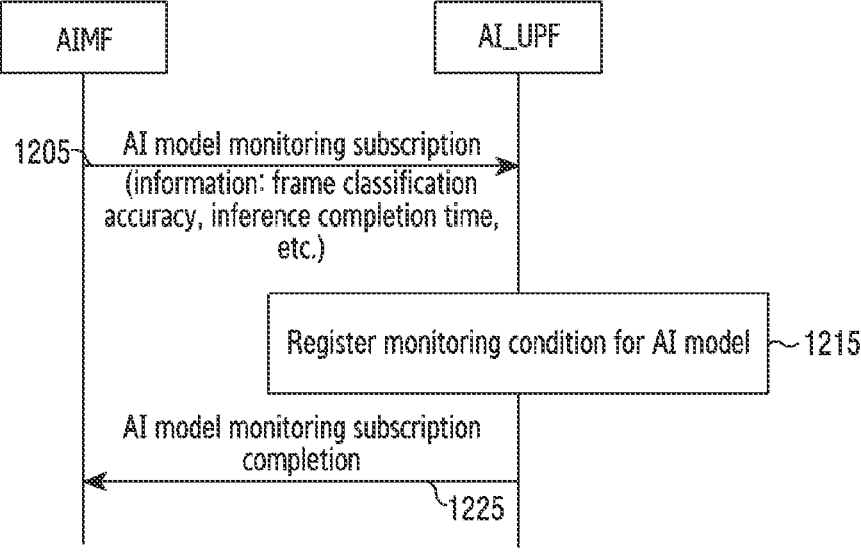
FIG. 12 illustrates a flow of signals for monitoring an AI model by an AI management function and a UPF having an AI model embedded therein, according to an embodiment.

FIG. 12 illustrates a flow diagram of signals for monitoring an AI model by an AI management function and a UPF having an AI model embedded therein, according to an embodiment. Specifically, detailed operations in which a UPF transmits/receives signals with an AIMF in order to monitor an AI model will be described with reference to FIG. 12.

In step 1205, the AIMF may send a request for AI model monitoring subscription to the UPF. The subscription information request that the AIMF sends to the UPF may include monitoring information regarding the performance of the AI model including at least one of frame classification accuracy and inference completion time.

In step 1215, the UPF may register a monitoring condition for the AI model. The UPF may register the monitoring condition, based on the AI model monitoring subscription received from the AIMF. Accordingly, the UPF may monitor an online trained AI model. While the AI model performs real-time training, the UPF may monitor the AI model of the UPF periodically or based on a trigger, and may sense an anomaly of the AI model performance or the like, based on the monitoring result.

By applying a frame-specific QoS based on the AI model's packet processing result, the UPF may receive feedback from the base station or terminal supposed to receive traffic. The UPF may identify a change in AI model performance, based on the received feedback result.

The UPF may independently identify a change in AI model performance, regardless of feedback of other entities. The UPF may identify whether the AI model's packet processing result satisfies a specific monitoring condition, based on a predetermined condition or a condition included in the subscription request received from the AIMF. The specific monitoring condition may include conditions for performing various operations, such as a condition for backing up the AI model or a condition for stopping online training of the AI model. For example, the UPF may identify the AI model's packet processing result, and may sense an anomaly in the AI model if a result value concentrated in a specific frame among I/P/B frames is derived from the frame analysis result, if a result substantially deviating from a normal ratio occurs, or if the interval value of the I-frame is identified as substantially deviating from a specific reference. The UPF may stop online training of the AI model upon sensing an anomaly of the AI model, based on the monitoring result. The UPF may then deactivate online training of the AI model. Alternatively, for example, the UPF may identify the AI model's packet processing result, and may back up the AI model if the packet processing result satisfies a specific monitoring condition related to AI model performance improvement. As described above, the monitoring compared with the packet processing result such that the UPF can determine the next operation after monitoring may include various conditions such as the AI model's performance, frame type identification, or classification result, and is not necessarily limited to the above-mentioned example.

In step 1225, the UPF may inform the AIMF of completion of AI model monitoring subscription. Completion of the AI model monitoring subscription may include a monitoring result regarding the AI model of the UPF. The completion of the AI model monitoring subscription may be transmitted through various signals, such as a response message or specific information.

As described above, if the UPF has registered a monitoring condition for the AI model, based on subscription of the AIMF, the UPF may monitor the AI model that is performing online training according to a configured period or trigger.

Figure 13:
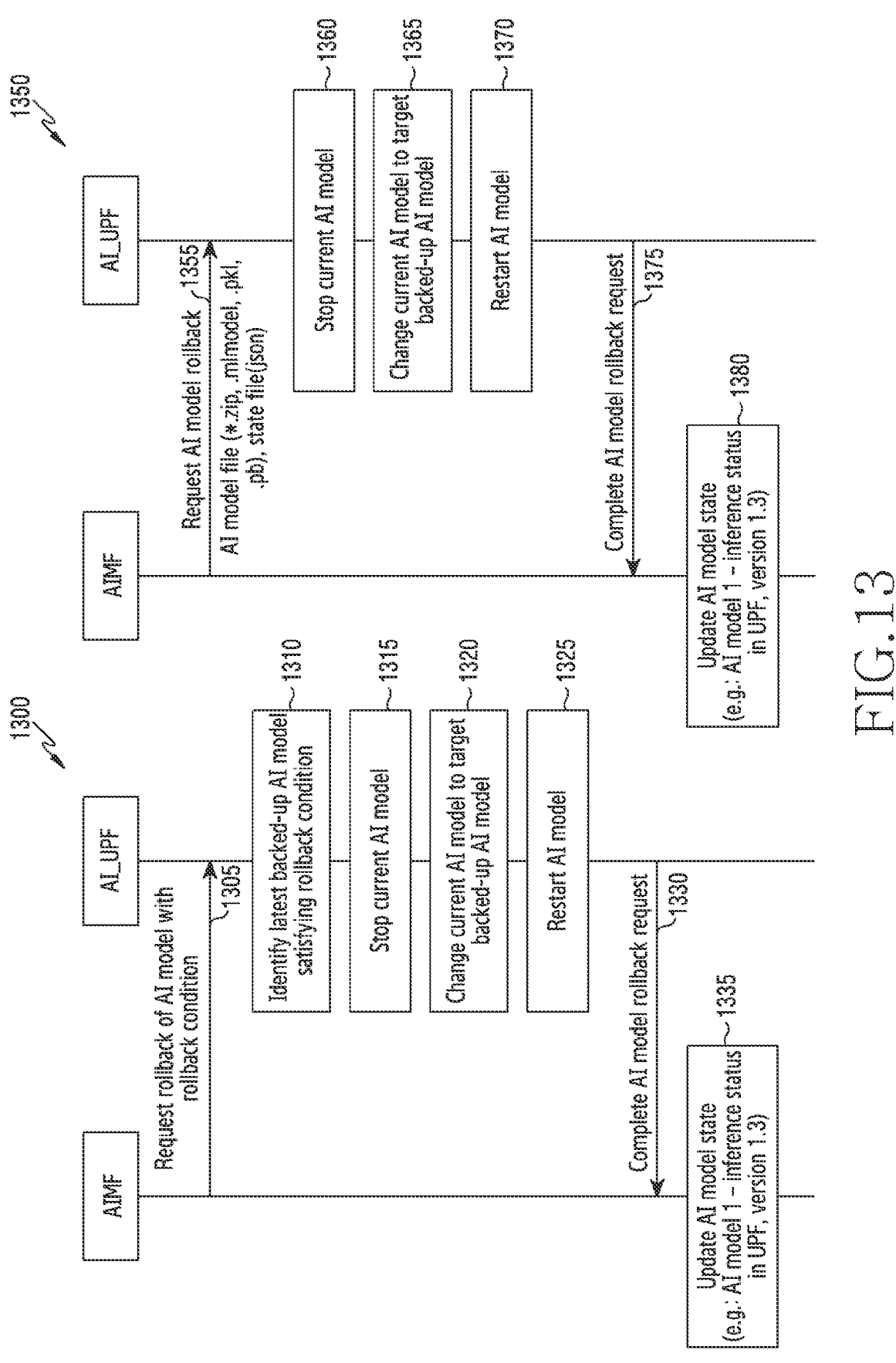
FIG. 13 illustrates a flow of signals for rolling back an AI model by an AI management function and a UPF having an AI model embedded therein, according to an embodiment.

FIG. 13 illustrates a flow diagram of signals for rolling back an AI model by an AI management function and a UPF having an AI model embedded therein, according to an embodiment. Specifically, detailed operations in which a UPF transmits/receives signals with an AIMF in order to roll back an AI model will be described with reference to FIG. 13. According to an embodiment, operations in FIG. 13 may obviously be organically combined with the AI model backup operation in FIG. 11 and the AI model monitoring operation in FIG. 12, and may also be performed separately as independent operations, without being limited thereto.

In a case in which the UPF has a backed-up AI model stored therein at 1300, or in a case in which the UPF has no backed-up AI model stored therein at 1350, the AIMF and the UPF may transmit/receive signaling in order to roll back the AI model.

The AIMF may identify whether the UPF has a backed-up AI model stored therein. If the operation related to AI model backup illustrated in FIG. 11 has not been performed, or if the UPF includes no information regarding the backed-up AI model although AI model backup has been performed, the AIMF may determine that UPF has no backed-up AI model stored therein.

In a case in which the UPF has a backed-up AI model stored therein at 1300, the AIMF may send a request for AI model rollback to the UPF together with a rollback condition in step 1305. While the AI model performs real-time training, the UPF may monitor the AI model of the UPF periodically or based on a trigger, and may sense an anomaly of the AI model performance or the like, based on the monitoring result. The AIMF may then send a request for AI model rollback to the UPF together with a rollback condition.

In step 1310, the UPF may identify a backed-up AI model that satisfies the rollback condition. The rollback condition may include at least one of a specific condition related to the AI model's performance or a specific condition regarding the backup timepoint. The UPF may identify an AI model that satisfies the rollback condition, based on the backed-up AI model and information regarding the state of the backed-up AI model (for example, timestamp, backup timepoint, inference performance).

In step 1315, the UPF may stop online training of the current AI model. As described in detail with reference to the monitoring process in FIG. 12, the UPF may stop online training of the AI model upon sensing an anomaly of the AI model, based on the monitoring result.

In step 1320, the UPF may change the current AI model to the backed-up AI model identified in step 1310.

In step 1325, the UPF may restart online training, based on the changed AI model. The UPF may restart online training, based on the version of the rolled-back AI model. In order to restart online training, the UPF may reactivate online training of the AI model, and the AI model may start online training, based on the version of the rolled-back AI model.

In step 1330, the UPF may inform the AIMF of completion of AI model rollback. The completion of AI model rollback may be transmitted through various signals such as a response message or specific information.

In step 1335, the AIMF may update the state of the AI model that the UPF includes. For example, the AIMF may update the version information of the AI model that the UPF includes currently (for example, version information of the rolled-back AI model) to "AI model 1-inference status in UPF, version 1.3". However, this is only an example, and the AI model state updated by the AIMF may obviously include various update operations meaning synchronization with the state of the AI model that the UPF includes.

In a case in which the UPF has no backed-up AI model stored therein at 1350, the AIMF may send a request for AI model rollback to the UPF together with information regarding the AI model in step 1355. While the AI model performs real-time training, the UPF may monitor the AI model of the UPF periodically or based on a trigger, and may sense an anomaly of the AI model performance or the like, based on the monitoring result. The AIMF may then send a request for AI model rollback to the UPF together with information regarding the AI model. The information regarding the AI model may include a file in which the AI model is included, or information in which information regarding the state of the AI model is included. The file is not limited to any specific format, and may include any format of files.

In step 1360, the UPF may stop online training of the current AI model. As described in detail with reference to the monitoring process in FIG. 12, the UPF may stop online training of the AI model upon sensing an anomaly of the AI model, based on the monitoring result.

In step 1365, the UPF may change the current AI model to the backed-up AI model received from the AIMF identified in step 1355.

In step 1370, the UPF may restart online training, based on the changed AI model. The UPF may restart online training, based on the version of the rolled-back AI model. In order to restart online training, the UPF may reactivate online training of the AI model, and the AI model may start online training, based on the version of the rolled-back AI model.

In step 1375, the UPF may inform the AIMF of completion of AI model rollback. The completion of AI model rollback may be transmitted through various signals such as a response message or specific information.

In step 1380, the AIMF may update the state of the AI model that the UPF includes. For example, the AIMF may update the version information of the AI model that the UPF includes currently (for example, version information of the rolled-back AI model) to "AI model 1-inference status in UPF, version 1.3". However, this is only an example, and the AI model state updated by the AIMF may obviously include various update operations meaning synchronization with the state of the AI model that the UPF includes.

As described above, in a case in which the AIMF requested the UPF to roll back the AI model, the UPF may perform an operation for AI model rollback, and may perform operations of AI model online training based thereon, and identifying frame types included in packets.

Figure 14:
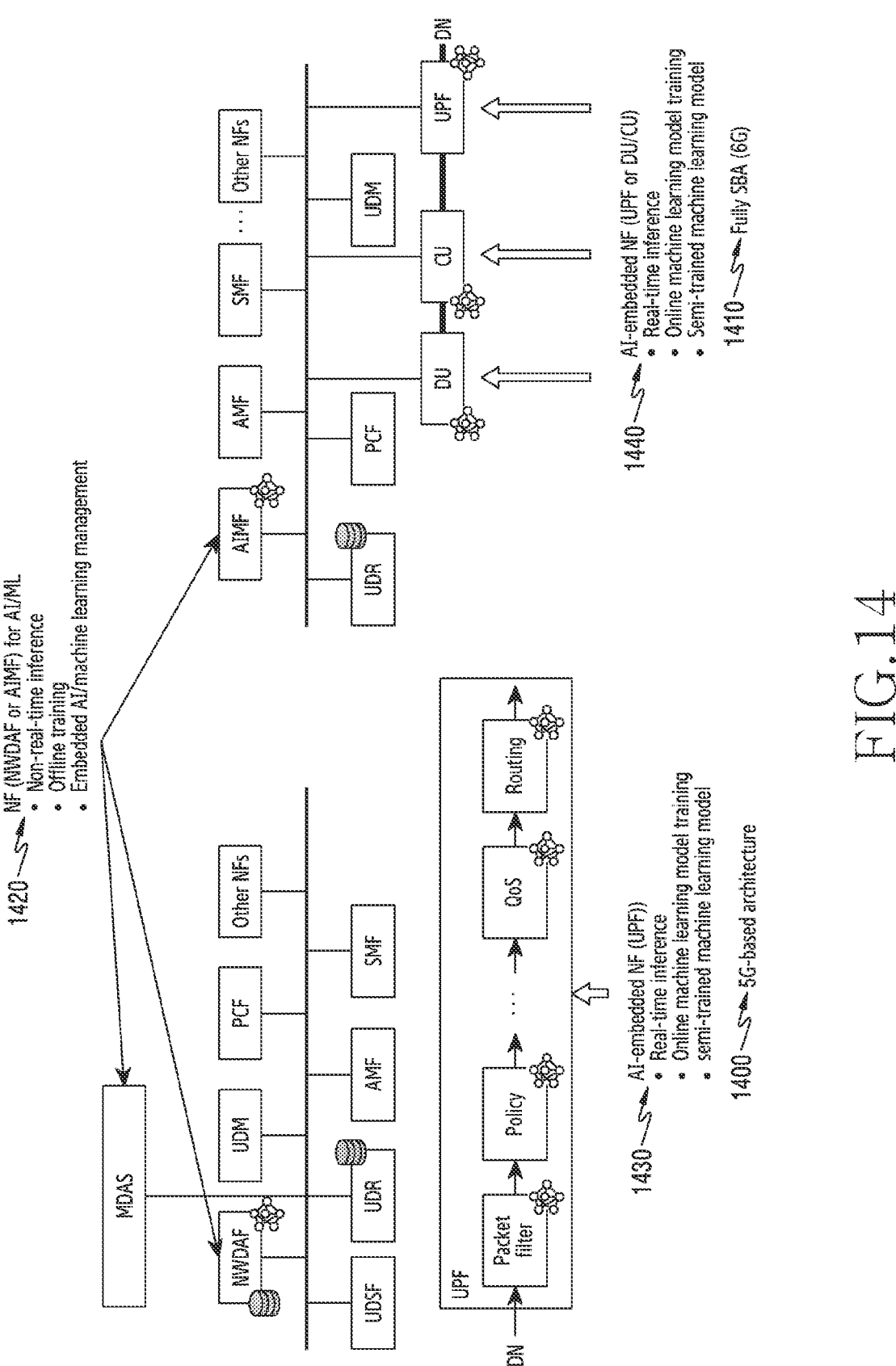
FIG. 14 illustrates an example of an AI model-related architecture, according to an embodiment.

FIG. 14 illustrates an example of an AI model-related architecture, according to an embodiment. Specifically, FIG. 14 illustrates an AI model-related 5G-based architecture 1400 and a fully SBA architecture 1410 which can be implemented in 6G.

The 5G-based architecture 1400-related network environment may include a UPF 1430 having embedded AI, an NWDAF including a separate AI model, and an MDAS. In this case, the UPF includes its own AI model and thus may process packets, based on the embedded AI model. Specifically, the UPF 1430 may perform real-time inference or online AI model training, based on the embedded AI model, without transmitting packets to a separate entity, or may include a semi-trained AI model. In addition, the MDAS or the NWDAF may include an AI model 1420, but the NWDAF or the like performs non-real-time inference or offline training. In this case, the UPF transmits packets to a separate entity (for example, (MDAS or NWAF) for inference of the AI model. This may cause delay and waste resulting from unnecessary packet storage.

The 6G-based fully SBA-related network environment 1410 may include a separate AI management function 1420 for managing the AI model, and not only the UPF, but also the base station's CU or DU may include an AI model 1440. In this case, an entity (for example, CU, DU, or UPF) with which packets are transmitted/received includes its own AI model, and each entity may process packets, based on the embedded AI model. Specifically, each entity may perform real-time inference or online AI model training, based on the embedded AI model, without transmitting packets to a separate entity, or may include a semi-trained AI model. In addition, the separate AI management function that manages the AI model may perform a function of controlling or managing the AI model of each entity, without directly receiving packets, and thus may perform more efficient and precise AI model-based packet processing.

The operations described with reference to FIG. 1 to FIG. 13 may be performed in the fully SAB environment 1410 in FIG. 14 and, without being limited thereto, may obviously be performed in a partially 5G-based environment 1400 as well.

According to an embodiment, a method performed by a user plane function (UPF) node in a wireless communication system may include receiving multiple traffic packets, identifying at least one encrypted traffic packet among the multiple traffic packets, identifying frame type information of the at least one traffic packet, based on an artificial intelligence (AI) model embedded in the UPF, identifying a quality of service (QoS) flow corresponding to at least one traffic packet, based on the identified frame type information, and transmitting the at least one traffic packet, based on the identified QoS flow.

According to an embodiment, a user plane function (UPF) node in a wireless communication system may include at least one transceiver, and at least one processor functionally coupled to the at least one transceiver. The at least one processor may be configured to receive multiple traffic packets, identify at least one encrypted traffic packet among the multiple traffic packets, identify frame type information of the at least one traffic packet, based on an artificial intelligence (AI) model embedded in the UPF, identify a quality of service (QoS) flow corresponding to at least one traffic packet, based on the identified frame type information, and transmitting the at least one traffic packet, based on the identified QoS flow.

It should be noted that the above-described configuration diagrams, illustrative diagrams of control/data signal transmission methods, illustrative diagrams of operation procedures, and structural diagrams are not intended to limit the scope of the disclosure. That is, all constituent elements, entities, or operation steps described in the embodiments of the disclosure should not be construed as being essential for the implementation of the disclosure, and the disclosure may be implemented without impairing the essential features of the disclosure by including only some constituent elements. In addition, the respective embodiments may be employed in combination, as necessary. For example, the methods disclosed herein may be partially combined with each other to operate a network entity and a terminal.

The above-described operations of a base station or terminal may be implemented by providing any unit of the base station or terminal device with a memory device storing corresponding program codes. That is, a controller of the base station or terminal device may perform the above-described operations by reading and executing the program codes stored in the memory device by means of a processor or central processing unit (CPU).

Various units or modules of a network entity, a base station device, or a terminal device may be operated using hardware circuits such as complementary metal oxide semiconductor-based logic circuits, firmware, or hardware circuits such as combinations of software and/or hardware and firmware and/or software embedded in a machine-readable medium. For example, various electrical structures and methods may be implemented using transistors, logic gates, and electrical circuits such as application-specific integrated circuits.

When implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory (RAM) and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Furthermore, a plurality of such memories may be included in the electronic device.

In addition, the programs may be stored in an attachable storage device which may access the electronic device through communication networks such as the Internet, intranet, local area network (LAN), wide LAN (WLAN), and storage area network (SAN) or a combination thereof. Such a storage device may access the electronic device via an external port. Furthermore, a separate storage device on the communication network may access a portable electronic device.

In the above-described embodiments, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, it will be apparent that various modifications and changes may be made thereto without departing from the scope of the disclosure. Therefore, the scope of the disclosure should not be defined as being limited to the embodiments, but should be defined by the appended claims and equivalents thereof. That is, it will be apparent to those skilled in the art that other variants based on the technical idea of the disclosure may be implemented. Furthermore, the above respective embodiments may be employed in combination, as necessary. For example, the methods disclosed herein may be partially combined with each other to operate a base station and a terminal. Furthermore, although the above embodiments have been described by way of 5G and NR systems, other variants based on the technical idea of the embodiments may also be implemented in other systems such as LTE, LTE-A, and LTE-A-Pro systems.

Although specific embodiments have been described in the detailed description of the disclosure, it will be apparent that various modifications and changes may be made thereto without departing from the scope of the disclosure. Therefore, the scope of the disclosure should not be defined as being limited to the embodiments, but should be defined by the appended claims and equivalents thereof.

What is claimed is:

1. A method performed by a user plane function (UPF) entity in a wireless communication system, the method comprising:

receiving multiple traffic packets;

identifying an encrypted traffic packet among the multiple traffic packets;

identifying frame type information of the encrypted traffic packet, based on an artificial intelligence (AI) model embedded in the UPF;

identifying a quality of service (QoS) flow corresponding to the encrypted traffic packet, based on the frame type information; and transmitting the encrypted traffic packet, based on the QoS flow, wherein the frame type information includes information indicating whether the encrypted traffic packet includes at least one of an intra frame (I-frame), a predictive frame (P-frame), or a bi-directional frame (B-frame).

2. The method of claim 1, further comprising:

receiving, from an artificial intelligence management function (AIMF) entity, information indicating an activation of online training of the AI model; and performing the online training of the AI model, based on the frame type information.

3. The method of claim 2, further comprising:

Receiving, from the AIMF entity, a request for deployment of the AI model;

deploying a version of the AI model, based on the request; and notifying the AIMF entity of a completion of deployment of the AI model.

4. The method of claim 2, further comprising:

receiving, from the AIMF entity, a request for backup of the AI model;

backing up a current version of the AI model, based on the request; and notifying the AIMF of a completion of backup of the AI model.

5. The method of claim 2, further comprising:

receiving, from the AIMF entity, a request for monitoring of the AI model;

determining a performance of the AI model; and receiving, from the AIMF entity, an indication determined based on the the performance, wherein the indication includes at least one of an indication to stop using the AI model, an indication to roll back the AI model, or an indication to back up the AI model.

6. The method of claim 5, wherein the performance of the AI model is determined based on a classification ratio of traffic packets, or feedback information from at least one entity receiving the encrypted traffic packet.

7. The method of claim 6, wherein, in case that the indication to roll back the AI model is received from the AIMF entity, the method further comprises:

identifying a version of another AI model to be changed, based on at least one of a rollback condition included in the indication to roll back the AI model or information on a backed-up AI model;

deactivating the online training of the AI model;

changing a deactivated AI model to the identified version of the another AI model to be changed;

activating an online training of the another AI model;

identifying another frame type information of at least one encrypted traffic packet, based on the another AI model and the online training; and notifying the AIMF of a completion of an AI model rollback request.

8. The method of claim 1, further comprising:

identifying an unencrypted traffic packet among the multiple traffic packets; and identifying frame type information of the unencrypted traffic packet, based on header information of the unencrypted traffic packet and payload header information.

9. The method of claim 1, wherein the frame type information is acquired based on the AI model, by using header information of the encrypted traffic packet as an input value, and wherein the header information includes at least one of a header size, a header reception interval, or an encoding algorithm.

10. The method of claim 1, wherein the encrypted traffic packet among the multiple traffic packets is encrypted using a secure real-time transport protocol (SRTP).

11. A user plane function (UPF) entity in a wireless communication system, the UPF entity comprising:

at least one processor; and at least one memory, communicatively coupled to the at least one processor, storing instructions executable by the at least one processor individually or in any combination to cause the UPF entity to:

receive multiple traffic packets, identify an encrypted traffic packet among the multiple traffic packets, identify frame type information of the encrypted traffic packet, based on an artificial intelligence (AI) model embedded in the UPF, identify a quality of service (QoS) flow corresponding to the encrypted traffic packet, based on the frame type information, and transmit the encrypted traffic packet, based on the identified QoS flow, wherein the frame type information includes information indicating whether the encrypted traffic packet includes at least one of an intra frame (I-frame), a predictive frame (P-frame), or a bi-directional frame (B-frame).

12. The UPF entity of claim 11, wherein the instructions further cause the UPF entity to:

receive, from an artificial intelligence management function (AIMF) entity, information indicating an activation of online training of the AI model, and perform the online training of the AI model, based on the frame type information.

13. The UPF entity of claim 12, wherein the instructions further cause the UPF entity to:

receive, from the AIMF entity, a request for deployment of the AI model, deploy a version of the AI model, based on the request, and notify the AIMF entity of a completion of deployment of the AI model.

14. The UPF entity of claim 12, wherein the instructions further cause the UPF entity to:

receive, from the AIMF entity, a request for backup of the AI model, back up a current version of the AI model, based on the request, and notify the AIMF of a completion of backup of the AI model.

15. The UPF entity of claim 12, wherein the instructions further cause the UPF entity to:

receive, from the AIMF entity, a request for monitoring of the AI model, determining a performance of the AI model, and receive, from the AIMF entity, an indication determined based on the performance, wherein the indication includes at least one of an indication to stop using the AI model, an indication to roll back the AI model, or an indication to back up the AI model.

16. The UPF entity of claim 15, wherein the performance of the AI model is determined based on a classification ratio of traffic packets, or feedback information from at least one entity receiving the encrypted traffic packet.

17. The UPF entity of claim 16, wherein, in case that the indication to roll back the AI model is received from the AIMF entity, the instructions further cause the UPF entity to:

identify a version of another AI model to be changed, based on at least one of a rollback condition included in the indication to roll back the AI model, or information on a backed-up AI model, deactivate the online training of the AI model, change a deactivated AI model to the identified version of the another AI model to be changed, activate an online training of the another AI model, identify another frame type information of the at least one encrypted traffic packet, based on the another AI model and the online training, and notify the AIMF of a completion of an AI model rollback request.

18. The UPF entity of claim 11, wherein the instructions further cause the UPF entity:

identify an unencrypted traffic packet among the multiple traffic packets, and identify frame type information of the unencrypted traffic packet, based on header information of the unencrypted traffic packet and payload header information.

19. The UPF entity of claim 11, wherein, the frame type information is acquired based on the AI model, by using header information of the encrypted traffic packet as an input value, and wherein the header information includes at least one of a header size, a header reception interval, or an encoding algorithm.

20. The UPF entity of claim 11, wherein the encrypted traffic packet among the multiple traffic packets is encrypted using a secure real-time transport protocol (SRTP).

* * * * *